(12) United States Patent
Parker

(10) Patent No.: US 8,777,153 B2
(45) Date of Patent: Jul. 15, 2014

(54) AEROFOIL

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 58 days.

(21) Appl. No.: 13/502,778

(22) PCT Filed: Oct. 19, 2010

(86) PCT No.: PCT/GB2010/051760
§ 371 (c)(1),
(2), (4) Date: Apr. 19, 2012

(87) PCT Pub. No.: WO2011/051699
PCT Pub. Date: May 5, 2011

(65) Prior Publication Data
US 2012/0228424 A1      Sep. 13, 2012

(30) Foreign Application Priority Data

Oct. 30, 2009 (GB) .................................. 0919019.0

(51) Int. Cl.
*B64C 3/56* (2006.01)

(52) U.S. Cl.
USPC .......................................................... 244/49

(58) Field of Classification Search
USPC ...................... 244/45 R, 49, 199.4, 201, 3.27
See application file for complete search history.

(56) References Cited

U.S. PATENT DOCUMENTS

| | | | | |
|---|---|---|---|---|
| 2,166,564 A | * | 7/1939 | Pavlecka et al. | 244/49 |
| 2,392,506 A | * | 1/1946 | Rossmann | 244/49 |
| 2,674,422 A | * | 4/1954 | Pellarini | 244/49 |
| 2,719,682 A | | 10/1955 | Handel | |
| 2,776,577 A | * | 1/1957 | Olchawa | 74/424.75 |
| 3,612,444 A | * | 10/1971 | Girard | 244/7 A |
| 4,269,374 A | * | 5/1981 | Miller | 244/2 |
| 4,289,996 A | * | 9/1981 | Barnes et al. | 318/38 |
| 4,973,092 A | | 11/1990 | Godbe et al. | |
| 5,310,138 A | * | 5/1994 | Fitzgibbon | 244/49 |
| 5,372,336 A | | 12/1994 | Paez | |
| 5,558,299 A | * | 9/1996 | Veile | 244/49 |
| 5,988,563 A | * | 11/1999 | Allen | 244/49 |
| 7,252,264 B2 | * | 8/2007 | Nattinger | 244/2 |
| 8,089,034 B2 | * | 1/2012 | Hammerquist | 244/3.28 |

FOREIGN PATENT DOCUMENTS

| | | |
|---|---|---|
| DE | 334 334 | 3/1921 |
| FR | 1 320 450 | 3/1963 |
| WO | WO 2008/024178 | 2/2008 |

OTHER PUBLICATIONS

International Search Report for PCT/GB2010/051760, Jun. 6, 2011.
Written Opinion for PCT/GB2010/051760, Jun. 6, 2011.
Search Report for GB 0919019.0 dated Feb. 27, 2010.
Extended European Search Report dated Aug. 30, 2013 in EP 13176294.0.

* cited by examiner

*Primary Examiner* — Tien Dinh
*Assistant Examiner* — Keith L Dixon
(74) *Attorney, Agent, or Firm* — Nixon & Vanderhye P.C.

(57) ABSTRACT

There is provided an aerofoil comprising an inboard section, a tip section moveable between a flying configuration and a parked configuration, a hinge shaft mounted at a compound angle in the inboard section, a fixed gear mounted concentrically on the hinge shaft and a drive gear coupled to the tip section and configured to mesh with the fixed gear, wherein a rotation of the drive gear against the fixed gear causes the tip section to rotate about the hinge shaft between the flying configuration and the parked configuration.

19 Claims, 26 Drawing Sheets

AEROFOIL

This application is the U.S. national phase of International Application No. PCT/GB2010/051760 filed 19 Oct. 2010 which designated the U.S. and claims priority to GB 0919019.0 filed 30 Oct. 2009, the entire contents of each of which are hereby incorporated by reference.

FIELD OF THE INVENTION

The invention relates to an aerofoil. Particularly, but not exclusively, the invention relates to an aerofoil comprising a rotary hinge unit to allow movement of a portion of the aerofoil between flying and parked configurations, and a rotary clamping unit to lock the aerofoil in the flying configuration.

BACKGROUND TO THE INVENTION

It is well understood that the fuel efficiency and aerodynamic performance of an aircraft is dependent on wingspan. It is therefore important to ensure that all aircraft are manufactured with their optimum wingspan.

For passenger aircraft, a limit on wingspan is set by the physical characteristics of gates at airport terminals. Such gates have historically accommodated aircraft with a maximum wingspan of thirty-six meters, meaning that aircraft with wingspans exceeding the thirty-six meter limit are generally unable to taxi to the gate. This makes larger wingspan aircraft much less practical than the smaller aircraft currently in use.

Modification of airport terminals to accommodate larger wingspan aircraft would be both expensive and disruptive. It would also necessarily lead to a corresponding reduction in the number of aircraft which could be accommodated simultaneously at the terminal, and therefore a reduction in overall airport capacity. As such, another solution must be found in order to improve the practicality of larger wingspan aircraft.

One proposal has been to provide large wingspan aircraft with a "piano-hinge" at the tip end of the wing, allowing the wing tip to be folded upwards from a horizontal configuration to a vertical configuration upon landing. This is shown in FIG. 1. In the vertical configuration, the wingspan of the aircraft is reduced so that the aircraft can access restricted size terminal gates.

However, it will be appreciated that the proposed piano-type hinge requires a significant amount of torque to be exerted in order to lift the wing tip out of the horizontal configuration. Providing such a large torque requires the wing to be equipped with a high-torque lifting means. High-torque lifting means of this type are heavy, and therefore their inclusion undesirably adds significant weight to both the wing and the aircraft. Furthermore, because the torque required to lift the wing tip rapidly reduces as the tip moves towards the vertical configuration, the high-torque capability of the lifting means is wasted for all but the initial phase of the lift. This proposal is therefore both extremely inefficient and heavy.

Whilst the vertical configuration of the wing described above may provide the potential for a large wingspan aircraft to access a restricted size airport gate, it is obviously crucial that the wing does not enter the vertical configuration when the aircraft is in flight. Previous folding wing designs have addressed this issue by employing a simple "shot-bolt" clamp to lock the wing tip in the horizontal configuration. It will be appreciated that a small amount of clearance is required in such "shot bolt" clamps in order to allow the shot bolt to slide freely when the clamp is to be engaged/disengaged. This clearance allows a small amount of play within the clamp which, although relatively small in the clamp itself, can translate to a relatively large movement at the tip of the wing due to the distance between the tip and the clamp. This can cause the wing tip to flutter during flight, which is extremely undesirable.

The natural vibration of the wing during flight causes the components of the clamps to wear relatively quickly, especially if the wing tip has begun to flutter. This increases the amount of play within the clamp. As the wear becomes significant, large and potentially dangerous wing tip movements are observed during flight meaning that, in order to maintain aircraft safety, it is necessary to replace the clamp on a frequent basis.

SUMMARY OF THE INVENTION

According to a first aspect of the invention, there is provided an aerofoil comprising an inboard section, a tip section moveable between a flying configuration and a parked configuration, a hinge shaft mounted at a compound angle in the inboard section, a fixed gear mounted concentrically on the hinge shaft, and a drive gear coupled to the tip section and configured to mesh with the fixed gear, wherein a rotation of the drive gear against the fixed gear causes the tip section to rotate about the hinge shaft between the flying configuration and the parked configuration.

The aerofoil may further comprise a free gear mounted concentrically on the hinge shaft and configured to mesh with the drive gear.

The free gear may comprise a reaction gear configured to balance cantilever loads exerted by the drive gear.

The fixed gear, drive gear and free gear may respectively comprise first, second and third bevel gears.

The hinge shaft may be mounted on an inner frame in the inboard section.

The drive gear may be mounted on a drive shaft extending from the tip section to the hinge shaft.

The drive gear may be coupled to a driving means mounted in the tip section, the driving means being configured to rotate the drive gear against the fixed gear.

An upper end of the hinge shaft may be tilted from a vertical axis in both a longitudinal and a chordal direction to create the compound angle.

The upper end of the hinge shaft may be tilted towards the tip section in the longitudinal direction and towards a trailing edge of the aerofoil in the chordal direction.

A rotation of the tip section between the flying configuration and the parked configuration may comprise a rotation of substantially ninety degrees about both a chordal axis of the aerofoil and a longitudinal axis of the aerofoil.

According to a second aspect of the invention, there is provided an aerofoil comprising an inboard section, a tip section moveable between a flying configuration and a parked configuration, a hinge shaft mounted at a compound angle in the inboard section, a drive gear mounted concentrically on the hinge shaft and a fixed gear coupled to the tip section and configured to mesh with the drive gear, wherein rotation of the drive gear against the fixed gear causes the tip section to rotate about the hinge shaft between the flying configuration and the parked configuration.

According to a third aspect of the invention, there is provided an aerofoil comprising an inboard section, a tip section moveable between a flying configuration and a parked configuration and a clamp unit configured to lock the tip section in the flying configuration, the clamp unit comprising a ramped slot and a clamp head configured to move along the slot until a frictional engagement corresponding to a locked configuration of the clamp unit is reached.

The clamp unit may further comprise an actuator configured to move the slot with respect to the clamp head until the frictional engagement between the slot and clamp head causes a predetermined torque limit of the actuator to be reached.

The clamp unit may comprise an actuator configured to move the clamp head with respect to the slot until the frictional engagement between the slot and the clamp head causes a predetermined torque limit of the actuator to be reached.

The slot may comprise an arcuate slot formed in a rotatably mounted plate, and the actuator may be configured to rotate the plate with respect to the clamp head to enter the locked configuration of the clamp unit.

The clamp head may have a T-shaped cross section and the slot may have a T-shaped cross-section configured to accommodate the clamp head.

The slot may comprise an entrance hole having a diameter larger than a maximum diameter of the clamp head to allow the clamp head to enter the slot.

The clamp unit may further comprise a bolt means, configured to block the entrance hole to prevent disengagement of the clamp head and the slot.

The clamp unit may further comprise a ratchet configured to prevent disengagement of the clamp head and the slot.

The ratchet may be configured to allow the slot to rotate with respect to the clamp head in a locking direction, whilst preventing the slot from rotating with respect to the clamp head in an unlocking direction.

The ratchet may be configured to allow the slot to rotate with respect to the clamp head such that the entrance hole moves away from the clamp head, whilst preventing the slot from rotating with respect to the clamp head such that the entrance hole moves towards the clamp head.

The ratchet may be released to allow disengagement of the clamp head and the slot, thereby allowing the aerofoil to enter the parked configuration.

The aerofoil may comprise a transparent window in a skin of the aerofoil to allow ground crew to inspect the relative positions of the clamp head and the slot in the locked configuration of the clamp unit.

DETAILED DESCRIPTION OF THE EMBODIMENTS

Exemplary embodiments of the invention will now be described with reference to FIGS. 2 to 26 of the accompanying Figures.

Figure 1:
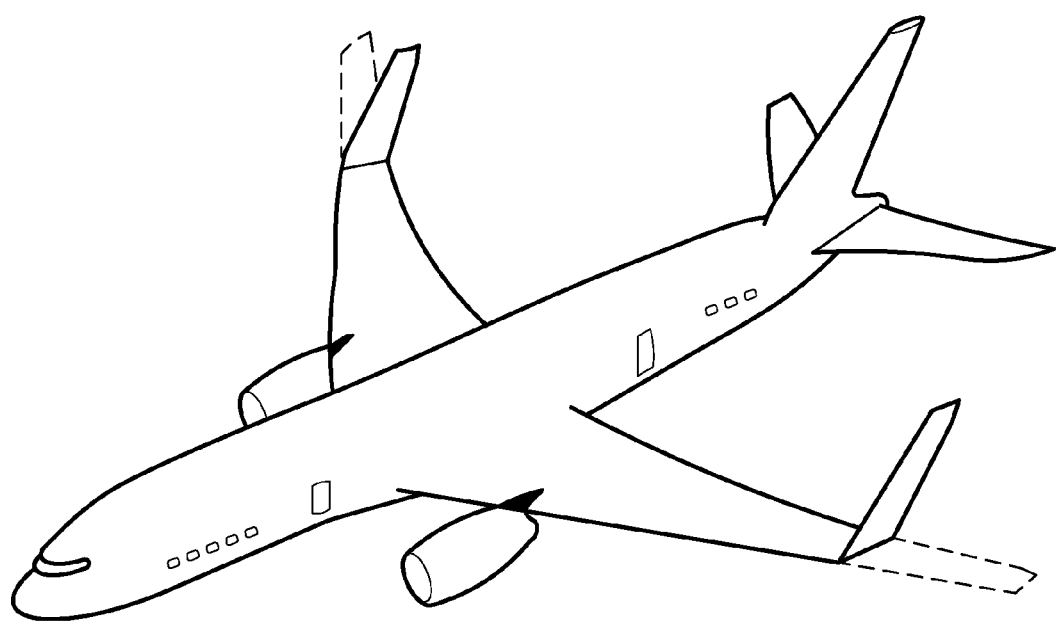
FIG. 1 is an illustration of a prior art piano-hinged wing.
Figure 2:
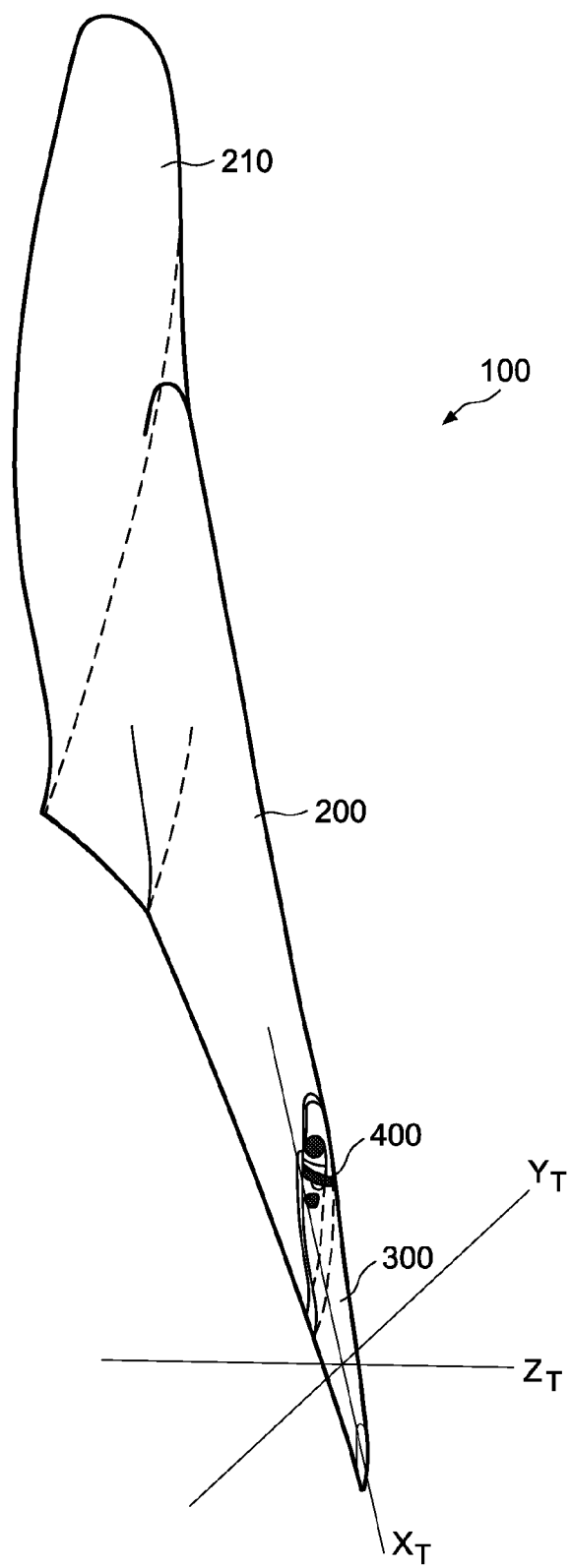
FIG. 2 is an illustration of a wing with an inboard section and a tip section aligned in a flying configuration. A Cartesian coordinate system of a tip section of the wing is shown, comprising longitudinal, chordal and vertical axes.

Referring to FIG. 2, an aerofoil 100 may consist of an aircraft wing 100 for use on an aircraft such as a jet airliner. The aircraft wing 100 comprises an inboard section 200, which includes a root 210 for securing the wing 100 to a fuselage of an aircraft. The wing 100 also comprises a tip section 300, which is located at the outer end of the wing 100 and may comprise one or more ailerons at its trailing edge. FIG. 2 shows the wing 100 in a flying configuration, in which the inboard section 200 and the tip section 300 are aligned in substantially the same geometric plane.

Figure 3:
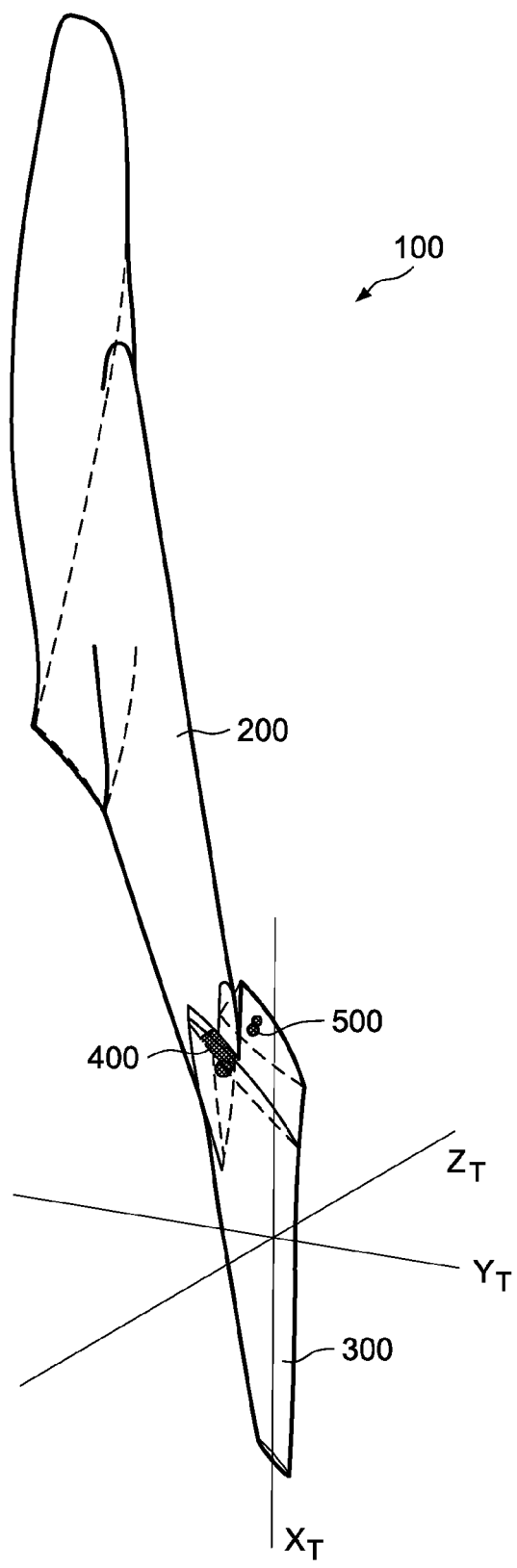
FIG. 3 is an illustration of a wing with an inboard section and a tip section in an intermediate configuration between a flying configuration and a parked configuration.
Figure 4:
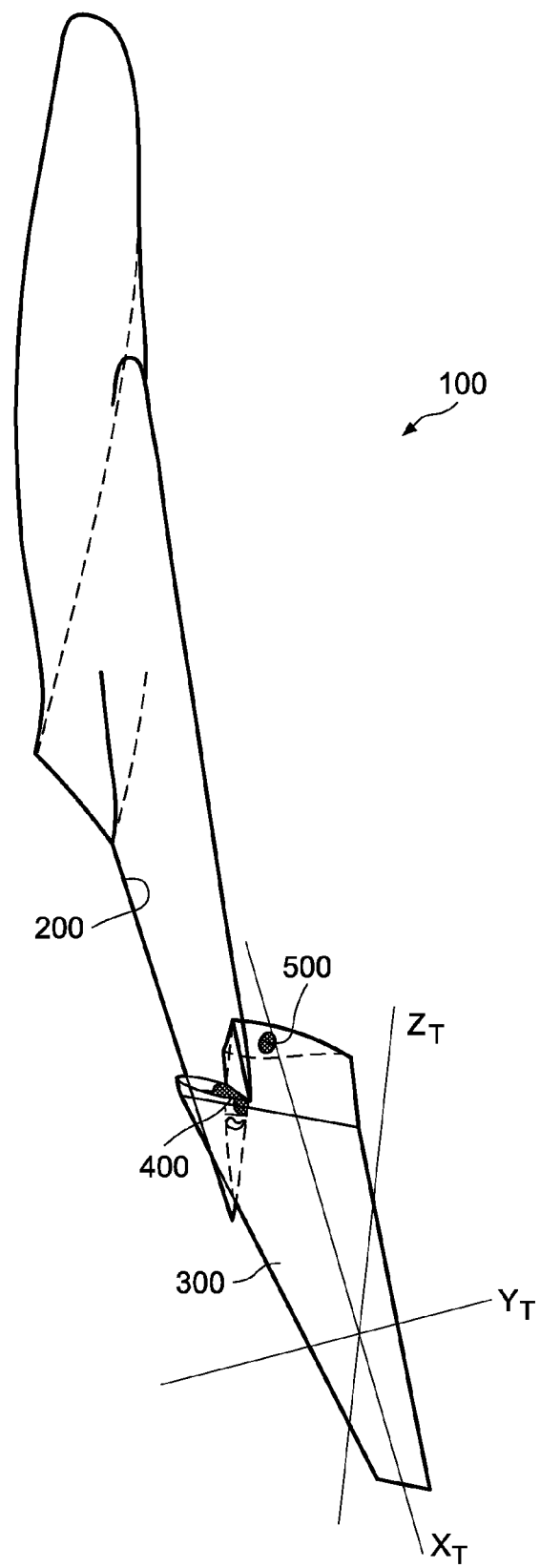
FIG. 4 is an illustration of a wing with an inboard section and a tip section in a parked configuration.

The inboard section 200 and the tip section 300 are coupled together at a hinge unit 400, which is configured to allow movement of the tip section 300 between the flying configuration and a parked configuration in which the wingspan of the aircraft is reduced. An example of a transitional position between the flying configuration and the parked configuration of the wing 100 is shown in FIG. 3. The parked configuration of the wing 100 is shown in FIG. 4. The transition between the flying configuration and the parked configuration of the wing 100 may involve a dual rotational movement, in which the tip section 300 of the wing 100 rotates substantially 90 degrees through two perpendicular axes of rotation. The geometric plane of the tip section 300 in the parked configuration may be substantially ninety degrees to the fixed geometric plane of the inboard section 200.

As is shown in FIGS. 2 to 4, a first aspect of a transition from the flying configuration to the parked configuration may be a rotation of a longitudinal axis $X_T$, which runs lengthways along the tip section 300, through ninety degrees. This may involve a transition from an orientation substantially parallel to a fixed longitudinal axis $X_I$ (see FIG. 16) of the inboard section 200 to an orientation substantially parallel to a longitudinal axis along the length of the fuselage of the aircraft.

A second aspect of the transition from the flying configuration to the parked configuration may be a rotation of a chordal axis $Y_T$, which runs across the width of the tip section 300, through ninety degrees. This may involve a transition from an orientation substantially parallel to the longitudinal axis of the fuselage of the aircraft to an orientation substantially perpendicular to both the longitudinal axis of the fuselage and the longitudinal axis $X_I$ of the inboard section 200 of the wing 100. The longitudinal axis $X_T$ and chordal axis $Y_T$ of the tip section 300 may be substantially horizontal and vertical respectively when the wing 100 is in the parked configuration.

It will be appreciated that the movement of the tip section 300 from the flying configuration shown in FIG. 2 to the parked configuration shown in FIG. 4 significantly reduces the wingspan of the aircraft. This may enable a large-wingspan aircraft to be accommodated at a size restricted airport gate.

Figure 11:
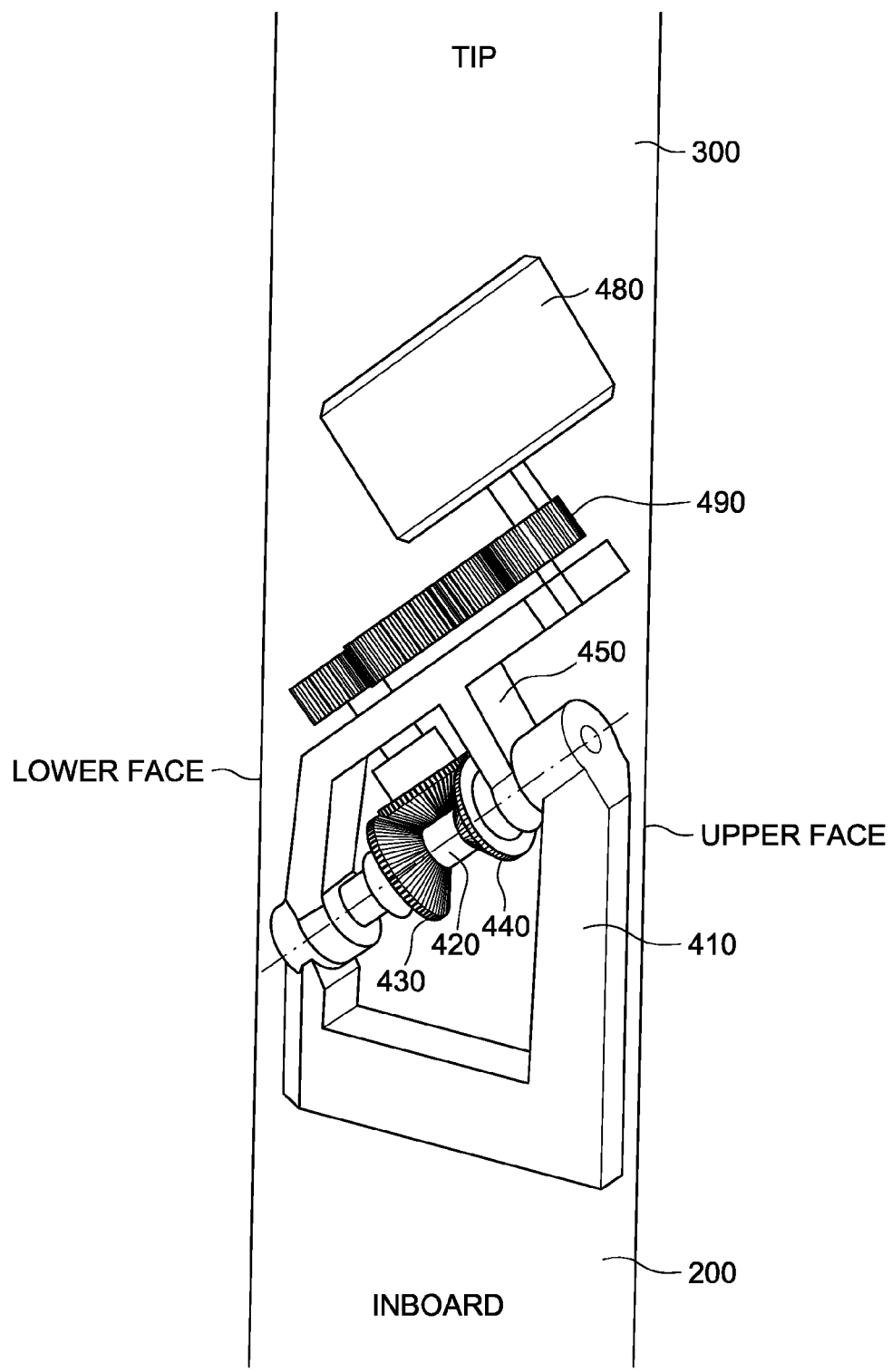
FIG. 11 is an illustration of the hinge unit shown in FIGS. 5 to 10 in a wing. The hinge unit is shown as being viewed from the trailing edge of the wing.
Figure 12:
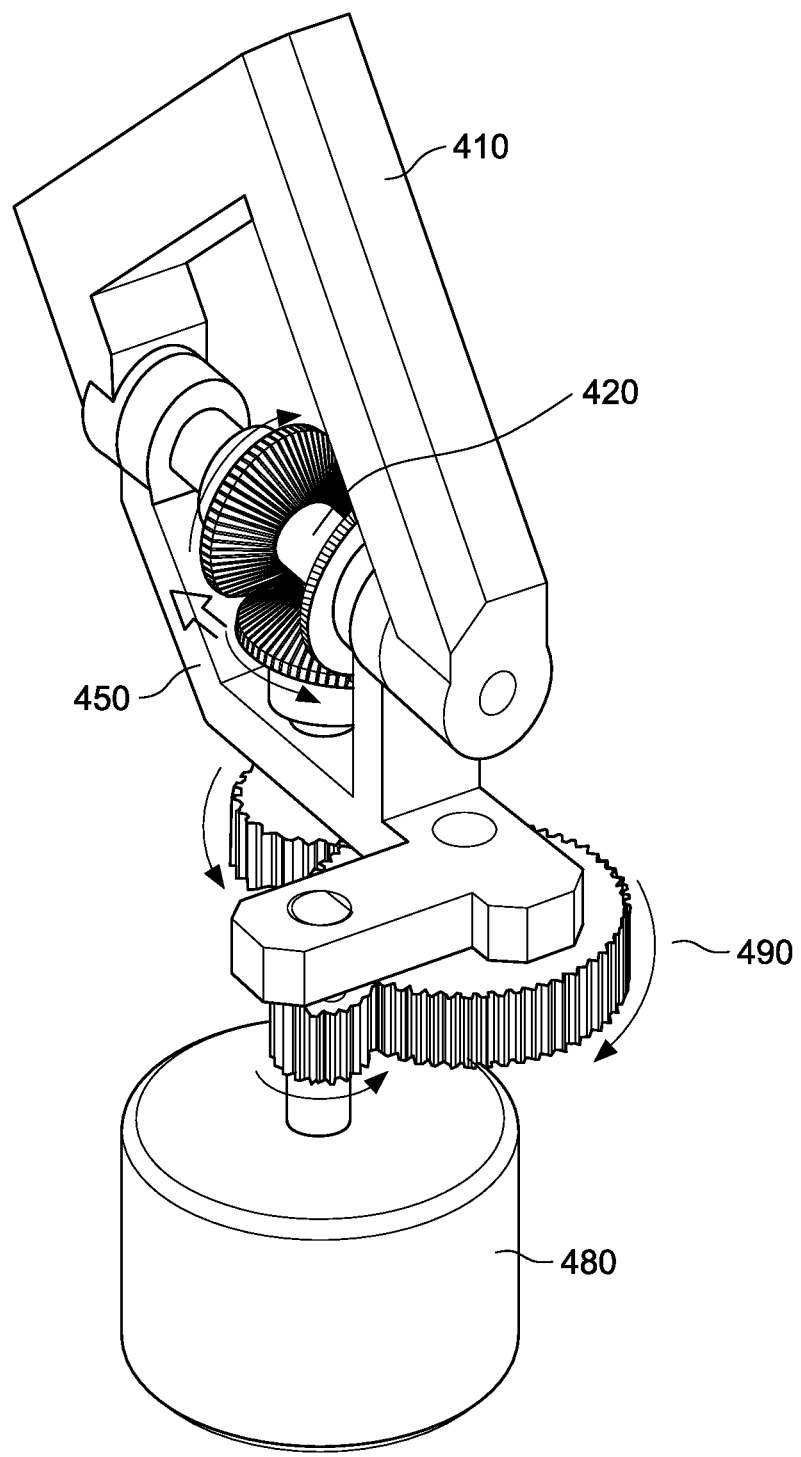
FIG. 12 is an illustration of the hinge unit shown in FIG. 5, with arrows showing a rotation of the drive gear, a drive shaft, a drive train, the free gear, and a climbing action of the drive gear about the fixed gear.

Referring to FIGS. 5 to 10, the hinge unit 400 may comprise an inner frame 410 which is immovably fixed in position relative to the inboard section 200 of the wing 100. For example, the inner frame 410 may be securely mounted inside an outer end portion of the inboard section 200 at the inboard section's outer end face. This may be achieved by securing the inner frame 410 to heavy structures within the inboard section 200 of the wing 100, such as front and rear spars (not shown). Optionally, a bridging spar (not shown) may extend transversely between the front and rear spars and the inner frame 410 may be secured to the bridging spar at a desired location. The inner frame 410 may comprise a fixed-position J-shaped or U-shaped primary structure 411, which is oriented in the inboard section of the wing 100 such that it presents an open end towards the tip section 300. This is illustrated in FIG. 11.

A hinge shaft 420 may be connected across the open end of the primary structure 411 and fixed in position such that it cannot rotate with respect to either the primary structure 411 or the inboard section 200 of the wing 100. For example, the hinge shaft 420 may be securely mounted to the ends of first and second arms 412, 413 of the U-shaped primary structure 411. The hinge shaft 420 may be equipped with a free gear 430 and a fixed gear 440, which are respectively rotatable and non-rotatable with respect to the hinge shaft 420. The free gear 430 may alternatively be referred to as a reaction gear 430, as will be explained below. Each of the gears 430, 440 may be concentrically aligned with the axis of the hinge shaft 420 and mounted at a fixed position such that neither gear 430, 440 is free to slide axially along the hinge shaft 420.

The free gear 430 and fixed gear 440 may respectively comprise first and second bevel gears 430, 440, which are substantially equivalent in size with corresponding helical/spiral, involute tooth profiles. The gears 430, 440 may be concentrically aligned with one another on the hinge shaft 420. The gears 430, 440 may also oppose each other, such that the tooth profile of the first bevel gear 430 faces that of the second bevel gear 440 along the axis of the hinge shaft 420. A gap may be provided between the mounted positions of the first and second bevel gears 430, 440 to allow the gears 430, 440 to simultaneously mesh with a driving gear 460, as is described in more detail below. A cross-sectional shape of the gap may be a flat-bottomed "V" or conical shape, in which the sloping sides of the "V" are formed by the first and second bevel gears 430, 440 and the flat base of the "V" is formed by a circumferential surface of the hinge shaft 420. This is clearly shown in FIG. 10.

The free bevel gear 430 may be mounted on a lower portion of the hinge shaft 420 (i.e. closer to the underside of the wing 100), and may be freely rotatable with respect to both the hinge shaft 420 and the inboard section 200 of the wing 100. The fixed bevel gear 440 may be mounted on an upper portion of the hinge shaft 420 (i.e. closer to the upper face of the wing 100), and fixed in position such that it cannot freely rotate with respect to either the hinge shaft 420 or the inboard section 200 of the wing 100. In an alternative configuration, the roles of the lower and upper bevel gears may be switched, such that the upper bevel gear is freely rotatable with respect to the hinge shaft 210 and the lower bevel gear is not.

The hinge unit 400 may further comprise an outer frame 450 which is immovably fixed in position relative to the tip section 300 of the wing 100. For example, as shown in FIG. 11, the outer frame 450 may be securely mounted inside an inner end portion of the tip section 300 of the wing 100 at the tip section's inner end face. The outer frame 450 may comprise a secondary U-shaped structure 451 oriented in the wing 100 such that it presents an open end toward the inner frame 410. The distance between the ends of first and second arms 453, 454 of the secondary structure 451 may be less than the distance between the ends of the first and second arms 412, 413 of the primary structure 411 described above.

As shown in FIGS. 5 to 10, the ends of the arms 453, 454 of the secondary structure 451 may be coupled to the hinge shaft 420 such that the hinge shaft 420 forms an axis about which the secondary structure 451 and outer frame 450 can rotate with respect to the inner frame 410 and inboard section 200 of the wing 100. For example, the coupling between the secondary structure 451 and the hinge shaft 420 may be facilitated by ring sections 452 at the end of each of the arms 453, 454 of the secondary structure 451. The hinge unit 400 may be assembled such that the hinge shaft 420 passes through each of the ring sections 452 before being secured to the open ends of the arms 412, 413 of the primary structure 411 of the inner frame 410, thereby securing the inner frame 410 and the outer frame 450 together. The outer diameter of the hinge shaft 420 may be less than the inner diameter of the ring sections 452 to allow the inner and outer frames 410, 450 to move with respect to one another about the axis of the hinge shaft 420. The hinge shaft 420 therefore provides a hinge line about which the tip section 300 of the wing 100 can move with respect to the inboard section 200 of the wing 100.

Referring again to FIGS. 5 to 10, the hinge unit 400 may further comprise a drive gear 460 inserted into the gap between the free gear 430 and the fixed gear 440 described above. The drive gear 460 may be configured to mesh with the free and fixed gears 430, 440 to allow it to exert a driving force against the tooth profile of both of the free and fixed gears 430, 440. For example, as clearly shown in FIGS. 5, 7 and 10, the drive gear 460 may comprise a third bevel gear 460 having a helical/spiral involute tooth profile substantially matching the tooth profile of the free gear 430 and fixed gear 440. The cross-sectional shape of the bevel drive gear 460 may correspond to the cross sectional shape of the gap between the free and fixed gears 430, 440 on the hinge shaft 420. This allows the teeth of the drive gear 460 to fully engage with the teeth of the free gear 430 and fixed gear 440.

Figure 5:
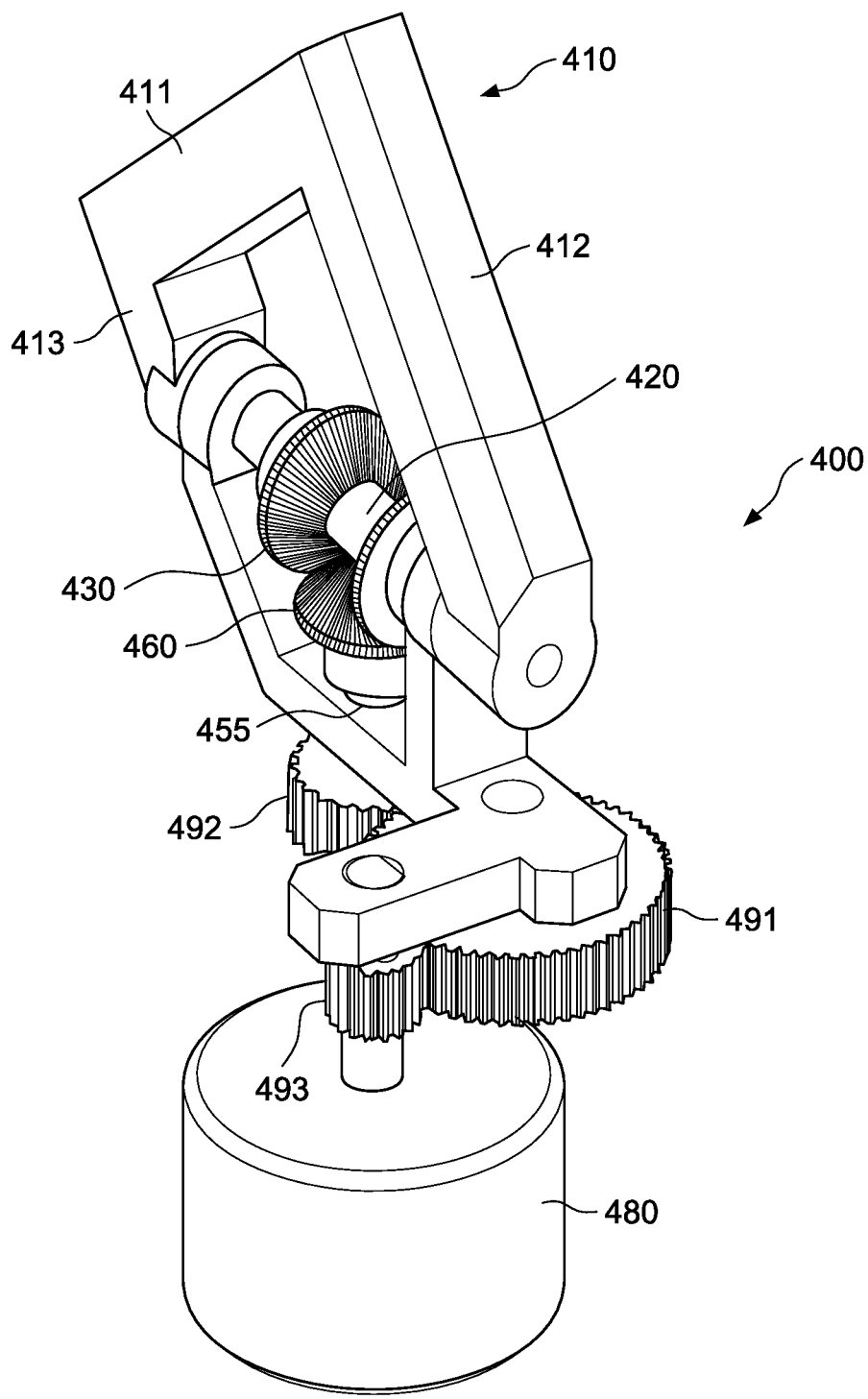
FIG. 5 is a first illustration of a hinge unit in a closed (flying) position, comprising a hinge shaft and a drive gear configured to rotate about a fixed gear and a free gear concentrically mounted on the hinge shaft.

The drive gear 460 may be securely mounted on an end of a drive shaft 470 such that the drive shaft 470 and the drive gear 460 cannot be rotated with respect to each other. The drive shaft 470 and drive gear 460 are, however, free to rotate with respect to the outer frame 450 and therefore also the tip section 300 of the wing 100 in which the outer frame 450 is immovably mounted. As shown in FIG. 5, the drive shaft may pass through a guide hole 455 in the secondary structure 451 to locate the drive shaft 470 on the outer frame 450 and ensure that the drive gear 460 meshes with the free gear 430 and fixed gear 440 on the hinge shaft 420. The drive shaft 470 may be coupled to a driving means 480 via a drive train 490 to cause rotation of the drive shaft 470 with respect to the outer frame 450. The driving means 480 may comprise a rotary actuator 480, consisting for example of a hydraulically or electrically driven stepper unit.

The driving means 480 may be securely mounted in the tip section 300 of the wing 100, for example on the outer frame 450, and coupled to the drive train 490 to supply a driving force through the drive train 490 to the drive shaft 470. The drive train 490 may comprise, for example, first and second meshing spur gears 491, 492 having helical/spiral, involute tooth profiles. The first of the spur gears 491 may be directly coupled to the driving means 480, and the second of the spur gears 492 may be directly coupled to the drive shaft 470. Alternatively, as shown in FIGS. 5 to 10, the first spur gear 491 may be coupled to the driving means 480 through meshing contact with a third spur gear 493 which is directly coupled to the driving means 480. The third spur gear may have a helical/spiral, involute tooth profile as with the first and second spur gears 491, 492. Referring again to FIGS. 5 to 10, the drive train 490 may be directly coupled to a rear of the outer frame 450 such that it is securely mounted inside the tip section 300 of the wing 100.

In an exemplary operation, rotation of a hydraulic actuator 480 or an electric stepper motor 480 in the tip section 300 of the wing 100 causes a corresponding rotation of the first spur gear 491 through a direct drive connection. The rotation of the first spur gear 491 causes the driving force originating from the stepper unit 480 to be exerted by the teeth of the first spur gear 491 against the teeth of the second spur gear 492, thereby causing a corresponding rotation of the second spur gear 492. The rotation of the second spur gear 492 leads to rotation of the drive shaft 470 through a direct drive connection between the second spur gear 492 and the drive shaft 470, and thereby also causing rotation of the drive gear 460 at the end of the shaft 470.

As discussed above, the drive gear 460 meshes between the free and fixed gears 430, 440. Rotation of the drive gear 460 therefore exerts a driving force against the teeth of both the free gear 430 and fixed gear 440, causing the free gear 430 to rotate on the hinge shaft 420 and the drive gear 460 to climb around the fixed gear 440. This movement is shown by the arrows in FIG. 12. As the drive gear 460 rotates and climbs around the fixed gear 440 on the hinge shaft 420, the coupling between the drive shaft 470 and the outer frame 450 at the guide hole 455 causes the outer frame 450 to follow the drive gear 460 around the axis of the hinge shaft 420 on the inner frame 410. Since the outer frame 450 is securely mounted to the tip section 300 of the wing 100, rotation of the drive gear 460 also causes the tip section 300 of the wing 100 to rotate around the axis of the hinge shaft 420.

The free gear 430 supports the reaction load exerted by the drive gear 460 as it rotates around the hinge shaft 420, and thereby resists the bending load applied to the cantilevered drive shaft 470 as the tip section 300 rotates.

The rotational movement of the outer frame 450 around the axis of the hinge shaft 420 is shown in FIGS. 5 to 10. For example, in FIG. 5 the hinge unit 400 is shown in a closed position corresponding to the position shown in FIG. 11 whereas, in FIG. 6, the hinge unit 400 is shown in an open position in which the outer frame 450 has been rotated around the axis of the hinge shaft 420. The closed position of the hinge unit 400 corresponds to the flying configuration of the wing 100 shown in FIG. 2, and the open position of the hinge unit 400 corresponds to the parked configuration of the wing 100 shown in FIG. 4. It will be appreciated that movement of the hinge unit 400 between the closed and open positions causes a transition of the wing 100 from the flying configuration to the parked configuration.

Figure 6:
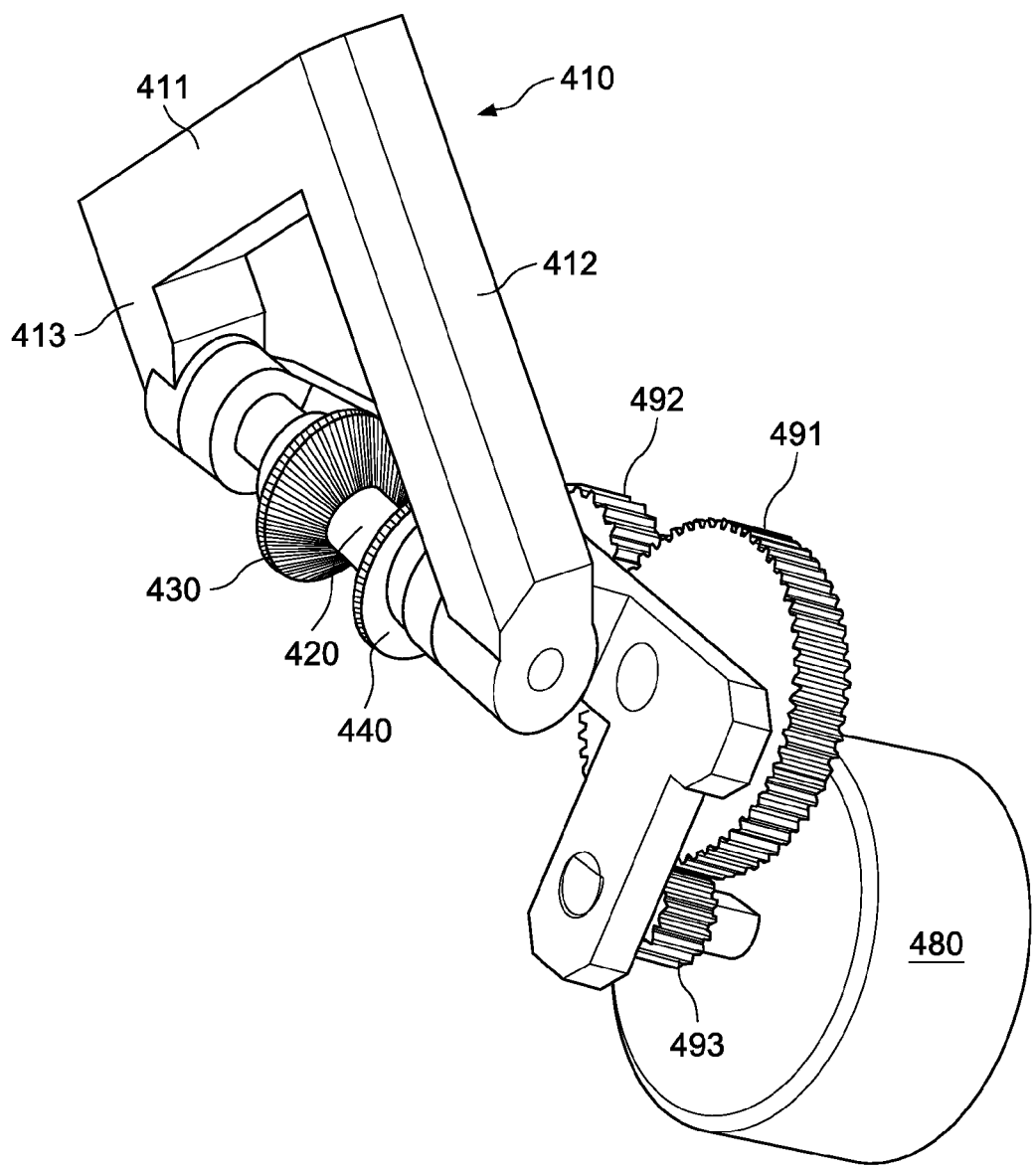
FIG. 6 is a first illustration of a hinge unit in an open (parked) position, comprising a hinge shaft and a drive gear configured to rotate about a fixed gear and a free gear concentrically mounted on the hinge shaft.
Figure 7:
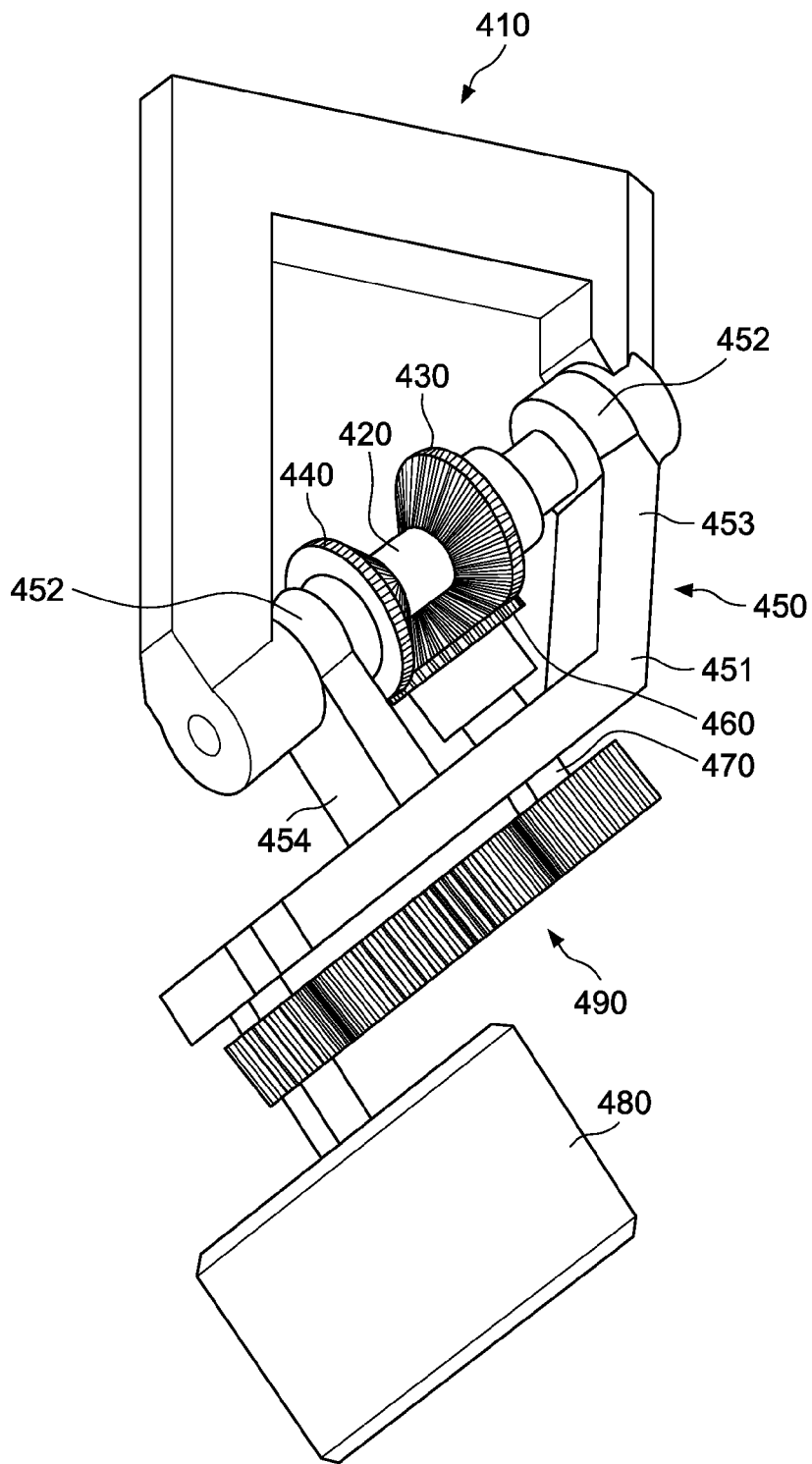
FIG. 7 is a second illustration of a hinge unit in a closed (flying) position, comprising a hinge shaft and a drive gear configured to rotate about a fixed gear and a free gear concentrically mounted on the hinge shaft.
Figure 8:
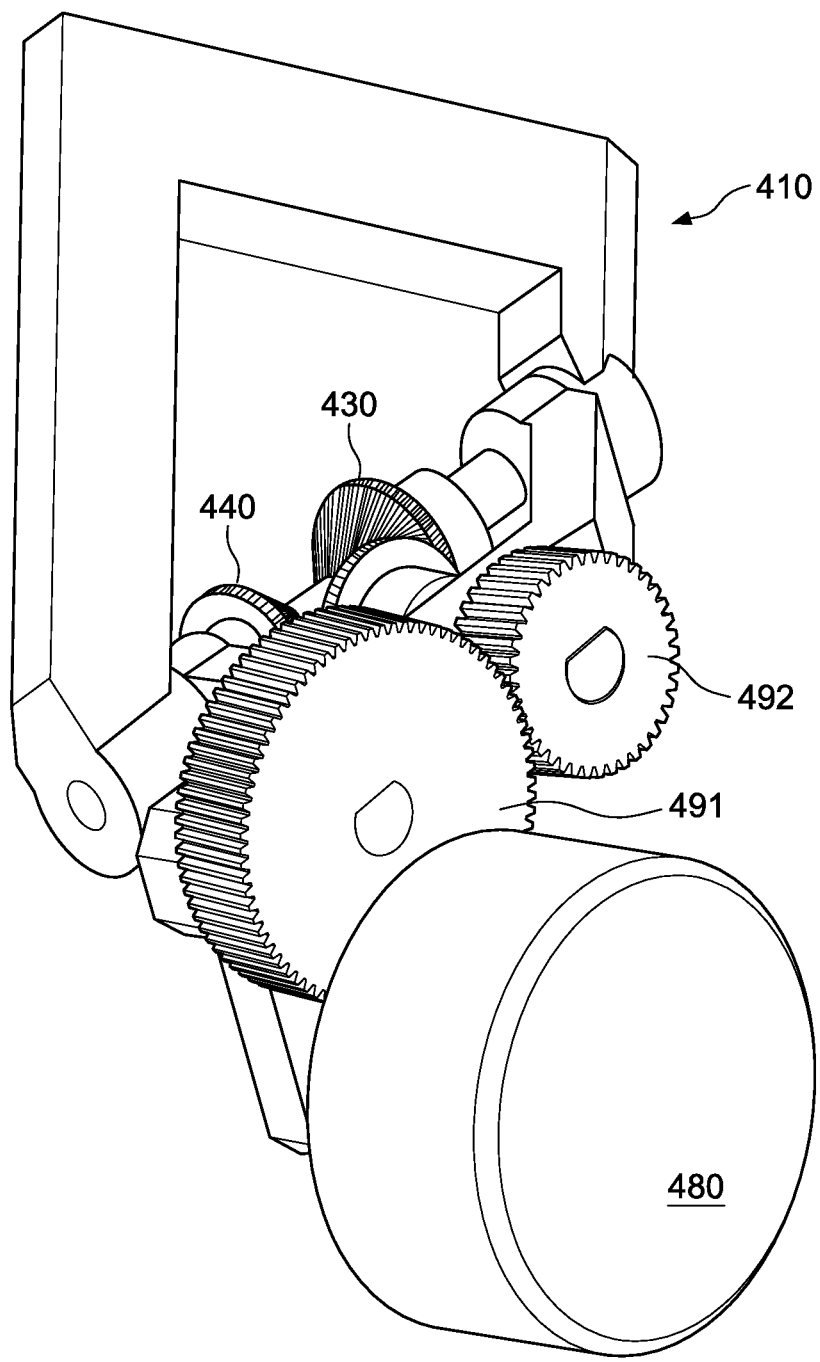
FIG. 8 is a second illustration of a hinge unit in an open (parked) position, comprising a hinge shaft and a drive gear configured to rotate about a fixed gear and a free gear concentrically mounted on the hinge shaft.
Figure 9:
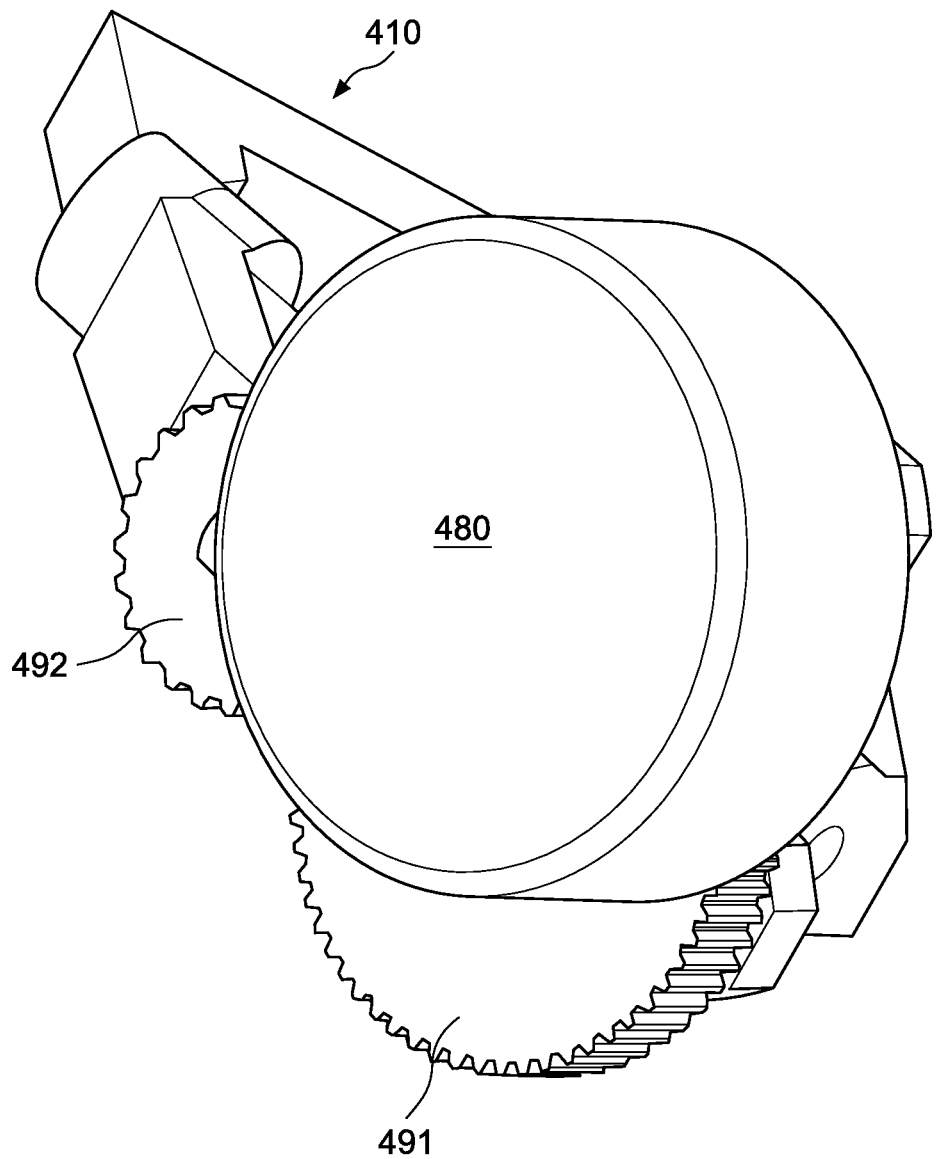
FIG. 9 is a third illustration of a hinge unit in a closed (flying) position, comprising a hinge shaft and a drive gear configured to rotate about a fixed gear and a free gear concentrically mounted on the hinge shaft.
Figure 10:
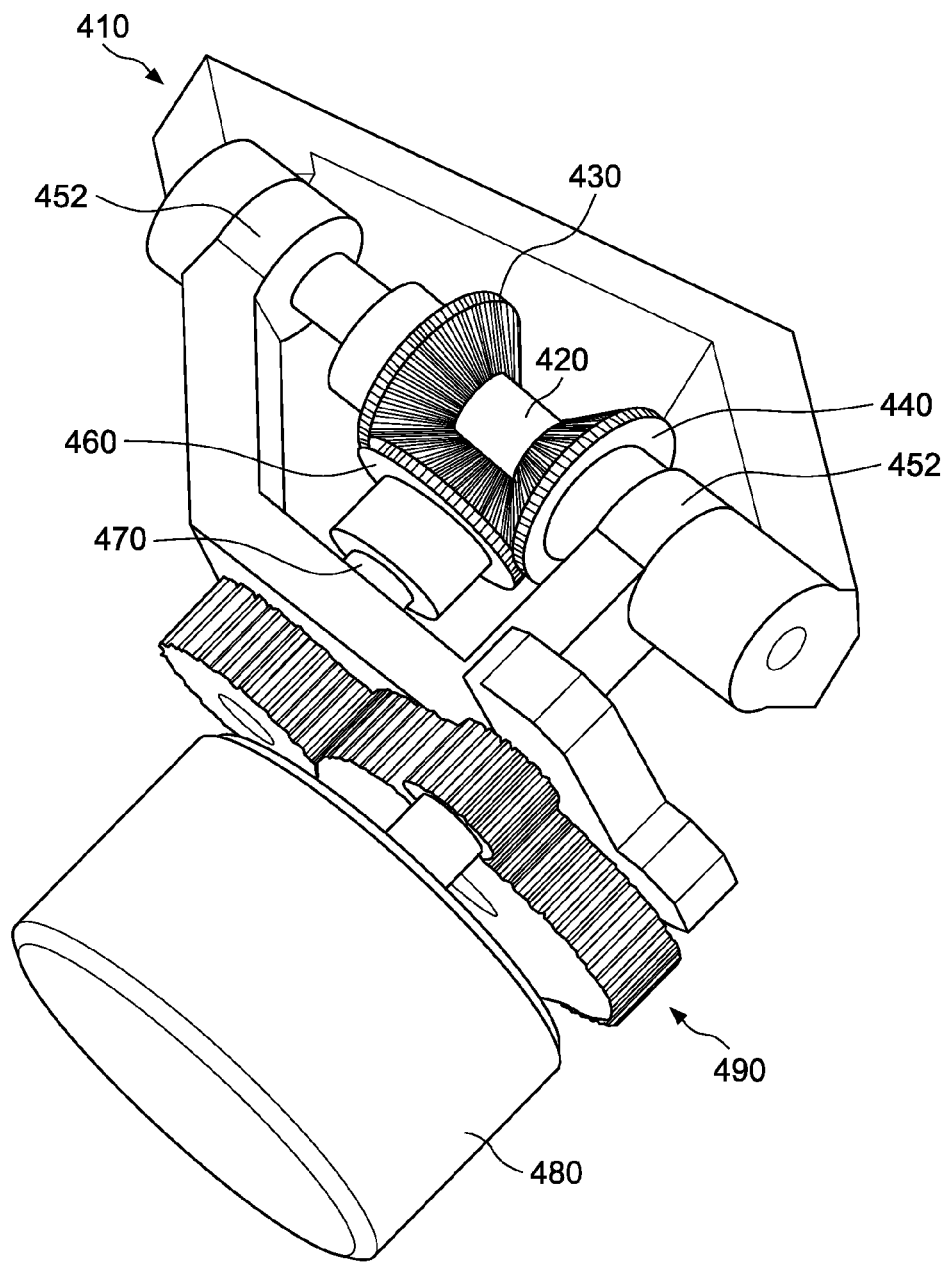
FIG. 10 is a third illustration of a hinge unit in an open (parked) position, comprising a hinge shaft and a drive gear configured to rotate about a fixed gear and a free gear concentrically mounted on the hinge shaft.

FIGS. 7 and 8 respectively show the hinge unit 400 in the closed and open positions described above from a different angle to the view shown in FIGS. 5 and 6. A further view of the closed and open positions is provided in FIGS. 9 and 10 respectively. The wing 100 itself is not shown in FIGS. 5 to 10 for the purposes of clearly representing the components of the hinge unit 400. However, the hinge unit 400 is shown together with the wing 100 in FIGS. 13 to 15, which show the wing 100 in the flying configuration (closed position of hinge unit 400), an intermediate configuration and the parked configuration (open position of hinge unit 400) respectively.

It will be appreciated that, in an alternative configuration, the roles of the positions of the drive gear and fixed gear could be switched. More specifically, the drive gear may be provided concentrically on the hinge shaft 420 in the position of the fixed gear shown in FIGS. 5 to 12 and the fixed gear may be coupled to the end of the shaft 470 in the tip section 300 in the position of the drive gear shown in FIGS. 5 to 12.

Figure 16:
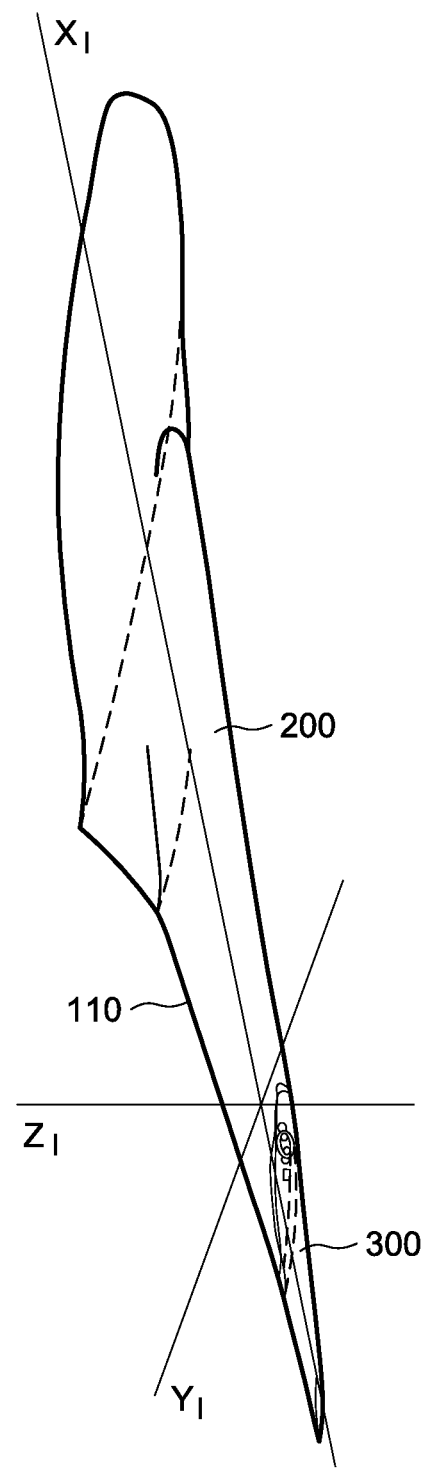
FIG. 16 is an illustration of a wing in a flying configuration showing a Cartesian coordinate system of an inboard section of the wing comprising longitudinal, chordal and vertical axes.

The hinge shaft 420 may be oriented at a compound angle within the inboard section 200 of the wing 100 to facilitate the dual rotation of the wing tip 300 described above. The angle of the hinge shaft 420 is referred to below using a Cartesian coordinate system comprising a longitudinal axis $X_I$ along the length of the inboard section 200 of the wing 100, a chordal axis $Y_I$ across the width of the inboard section 200 of the wing 100 and a vertical axis $Z_I$ through the depth of the inboard section 200 of the wing 100. These axes are shown in FIG. 16. Starting from a position parallel with the vertical axis $Z_I$, the hinge shaft 420 may be tilted in both the longitudinal $X_I$ and chordal $Y_I$ directions to provide a compound angle hinge line comprising a longitudinal tilt element and a chordal tilt element. This is described below in relation to FIG. 11. The compound angle of the hinge shaft 420 is described below with respect to the vertical axis $Z_I$ of the inboard section. Starting from a vertical position, the top end of the hinge shaft 420 closest to the upper edge of the wing 100 is tilted with respect to the bottom end of the shaft 420 both towards the trailing edge 110 of the wing 100 (chordal tilt element) and towards the tip of the wing 100 (longitudinal tilt element). The primary structure 411 may be tilted towards the trailing edge 110 of the wing 100 at the same angle. This is shown in FIGS. 5 to 12.

A corresponding tilt to that described above for the primary structure 411 may also apply to the orientation of the secondary structure 451 with respect to the longitudinal, chordal and vertical axes $X_T$, $Y_T$ and $Z_T$ of the tip section 300 of the wing 100. The precise orientation of the hinge shaft 420, the primary structure 411 and the secondary structure 451 in the wing 100 may be configured in dependence of the exact desired rotational movement of the tip section 300.

The compound angle configuration of the hinge shaft 420 and secondary structure 451 described above ensures that the torque required to move the tip section 300 of the wing 100 between the flying configuration and the parked configuration is relatively constant over the transition. The very high torque level actuator required to perform the initial phase of lifting a piano-type hinged tip is not necessary. Instead, a less powerful, lighter and more compact driving means 480 can be used, which operates close to its optimum torque level over the entire movement between the flying and parked configurations of the wing 100. The load on the driving means 480 can be reduced by reducing the gearing in the drive train 490. Additionally or alternatively, the load on the driving means 480 can be reduced by reducing the gearing at the drive gear 460 or at the free and fixed gears 430, 440. This may allow further weight and size reductions at the driving means 480.

Figure 17:
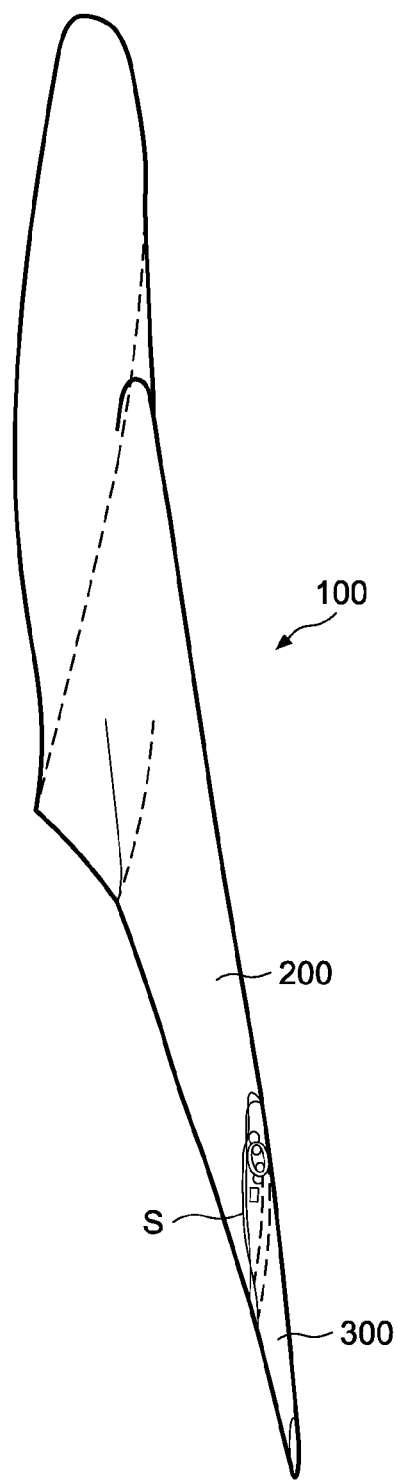
FIG. 17 is an illustration of a wing in a flying configuration showing a separation line between an inboard section and a tip section of the wing.

Separation of the inboard and tip sections 200, 300 of the wing 100 may be facilitated by the abutting faces of the inboard and tip sections 200, 300 being angled appropriately. For example, at the trailing edge of the wing 100, the abutting faces of the inboard and tip sections 200, 300 of the wing 100 may meet each other at an angle which is approximately ninety degrees to the longitudinal tilt element of the hinge shaft 420. At the leading edge of the wing 100, the abutting faces of the inboard and tip sections 200, 300 of the wing 100 may meet each other at an angle which is approximately equal to the chordal tilt element of the hinge shaft 420. Therefore, the angle at which the abutting faces meet each other at the leading edge of the wing 100 may differ from the angle at which the abutting faces meet each other at the trailing edge of the wing 100. As is shown by FIG. 17, in this configuration, the separation line S between the inboard and tip sections 200, 300 may extend in a curve across the upper and lower surfaces of the wing 100. A significant portion of the separation line may extend across the upper and lower faces of the wing at an acute angle with respect to the chordal axes $Y_I$ and $Y_T$. The separation line S may also extend across the leading and trailing faces of the wing 100 at an acute angle with respect to the vertical axes $Z_I$ and $Z_T$.

The wing 100 may further comprise a clamp unit 500 comprising an engaging means 510 and a receiving means 520 configured to accommodate the engaging means to clamp the wing 100 in the flying configuration. Referring to FIGS. 18 to 26, the engaging means 510 may comprise a catch 510 secured to the inboard section 200 of the wing 100. The catch 510 may have an approximately T-shaped cross-section with a head 511 facing towards the tip section 300 of the wing 100 and a stem 512 extending away from the head 511 towards the root 210 of the inboard section 200 of the wing 100. The catch 510 may, for example, comprise a "mushroom" shaped catch. The head 511 of the catch 510 may be referred to as the clamp head 511.

Figure 26:
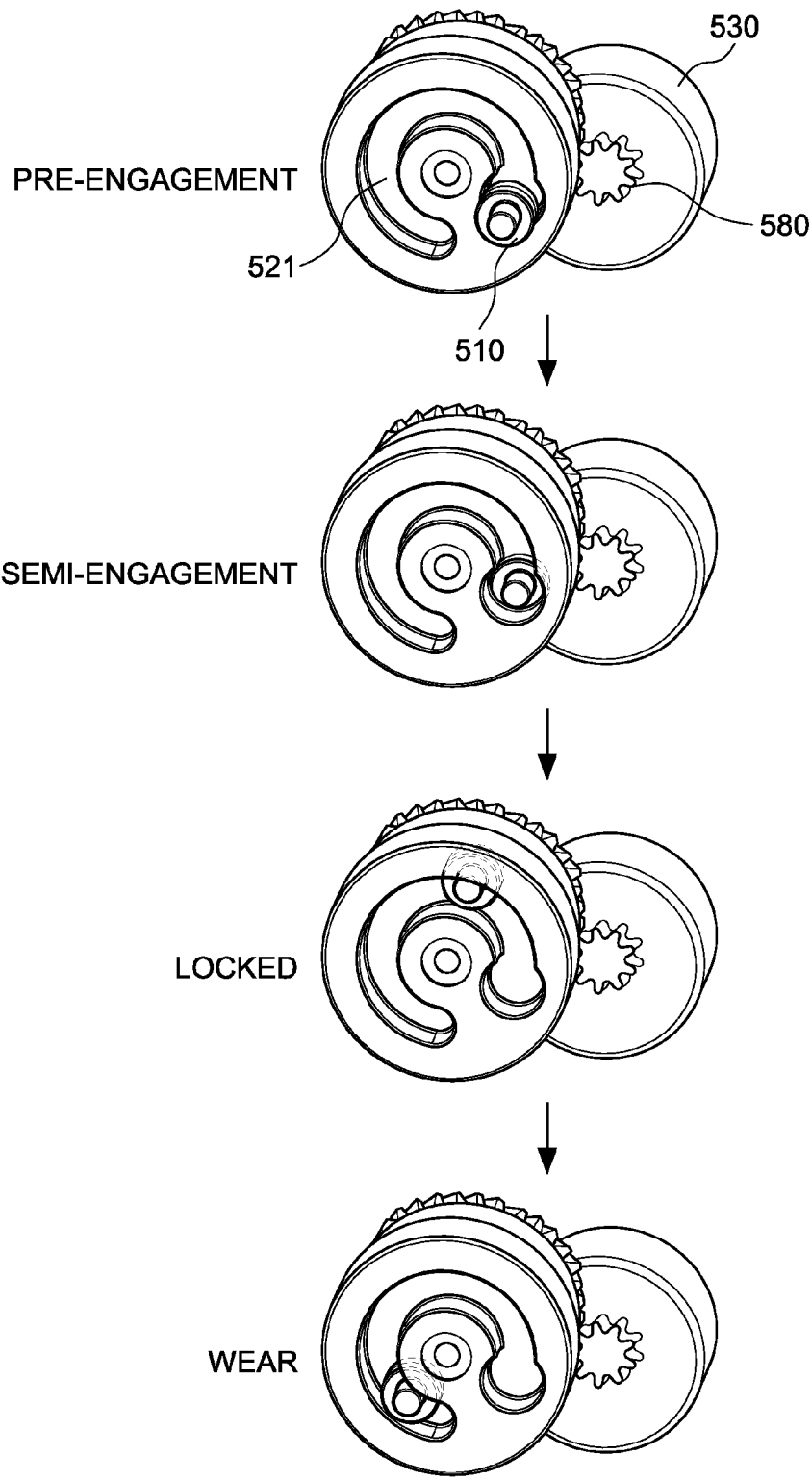
FIG. 26 is an illustration of the clamp unit shown in FIGS. 18 to 25, showing various interlocking positions of a clamp head and engagement slot. The clamp unit is shown in a pre-engaged state, a semi-engaged state, a locked state, a locked state in which the head is worn.

The receiving means 520 of the clamp unit 500 may comprise a substantially circular plate 520 secured to the tip section 300 of the wing 100, comprising an arcuate slot 521 configured to engage with the head 511 of the catch 510 in order to provide a lock between the catch 510 and the plate 520. The arcuate slot 521 may have an approximately T-shaped cross-section substantially matching the T-shaped cross-section of the catch 510, such that the catch 510 cannot be freely removed from the slot 521 when the two are locked together. More specifically, as is shown in FIGS. 22, 23 and 26, the profile of the slot 521 may wrap around the profile of the head 511 of the catch 510 when the two are engaged to prevent the head 511 from being removed from the slot 521.

Figure 18:
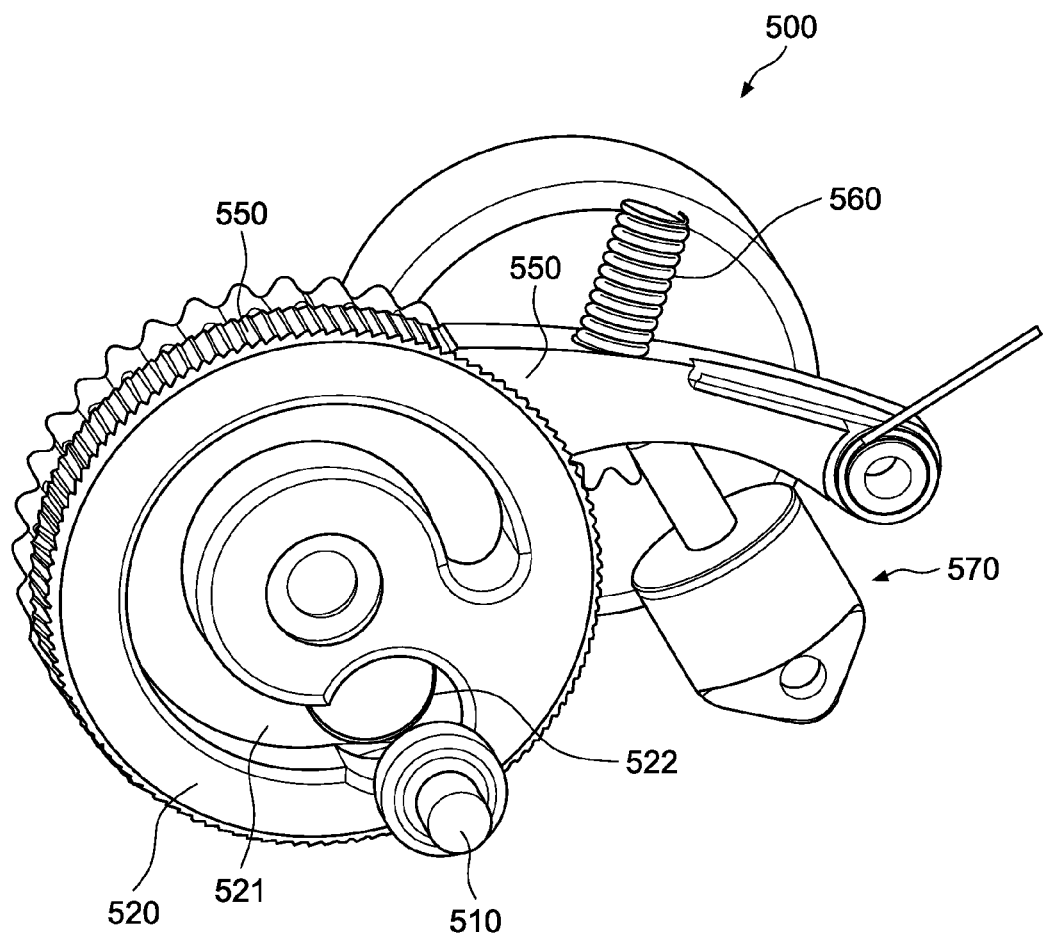
FIG. 18 is an illustration of a clamp unit for locking a tip section of a wing in a flying configuration. A first view is shown of the clamp unit in a pre-engaged state.
Figure 19:
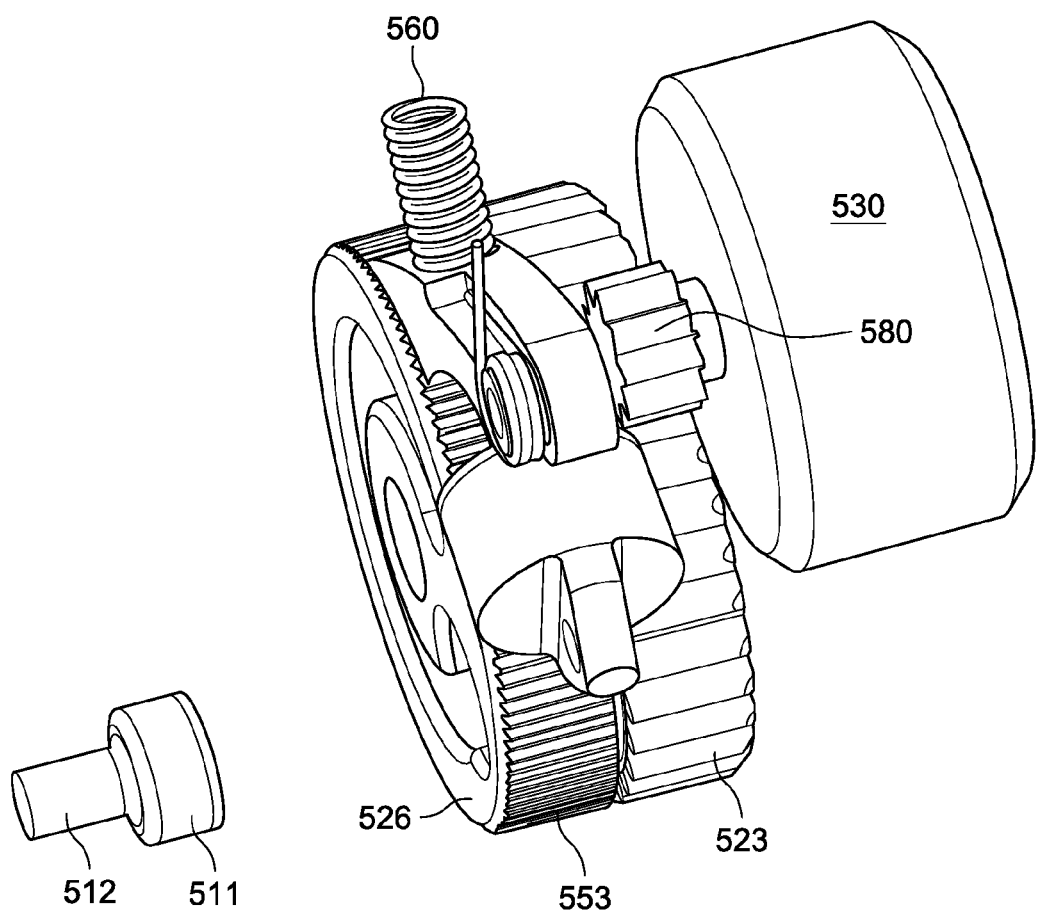
FIG. 19 is an illustration of a clamp unit for locking a tip section of a wing in a flying configuration. A second view is shown of the clamp unit in a pre-engaged state.
Figure 20:
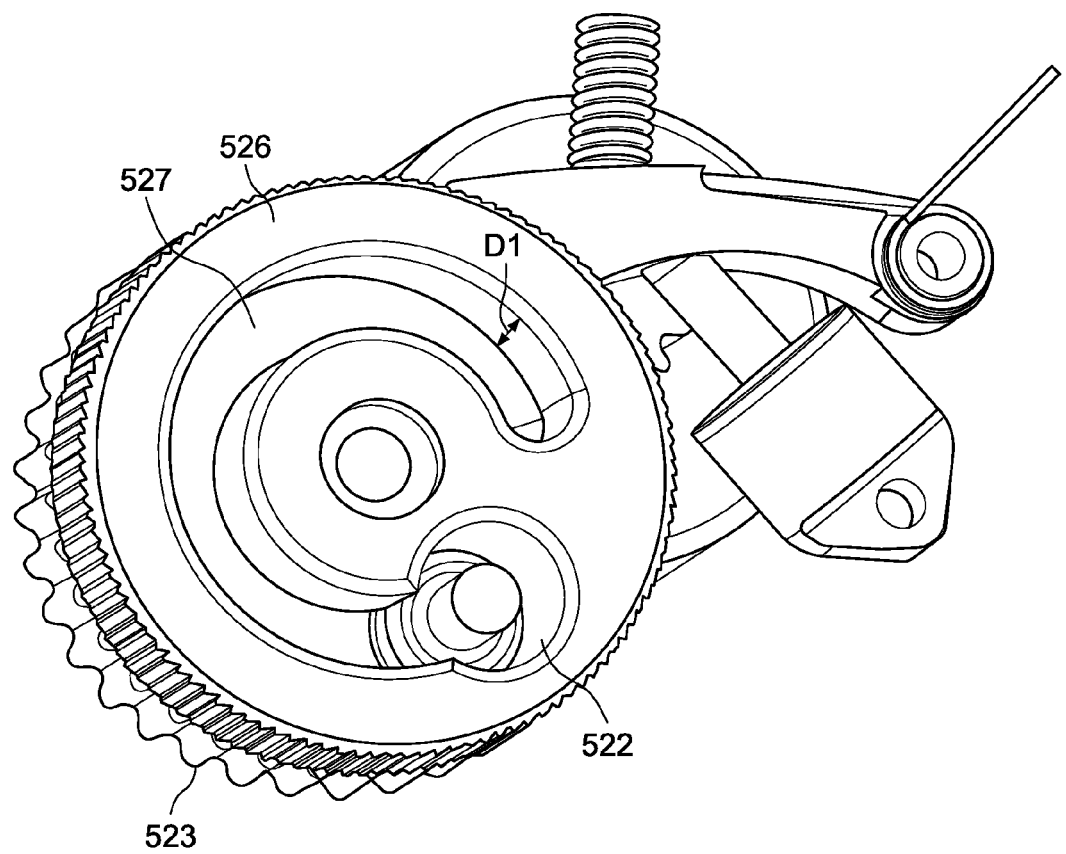
FIG. 20 is an illustration of a clamp unit for locking a tip section of a wing in a flying configuration. A first view is shown of the clamp unit in a semi-engaged state.
Figure 21:
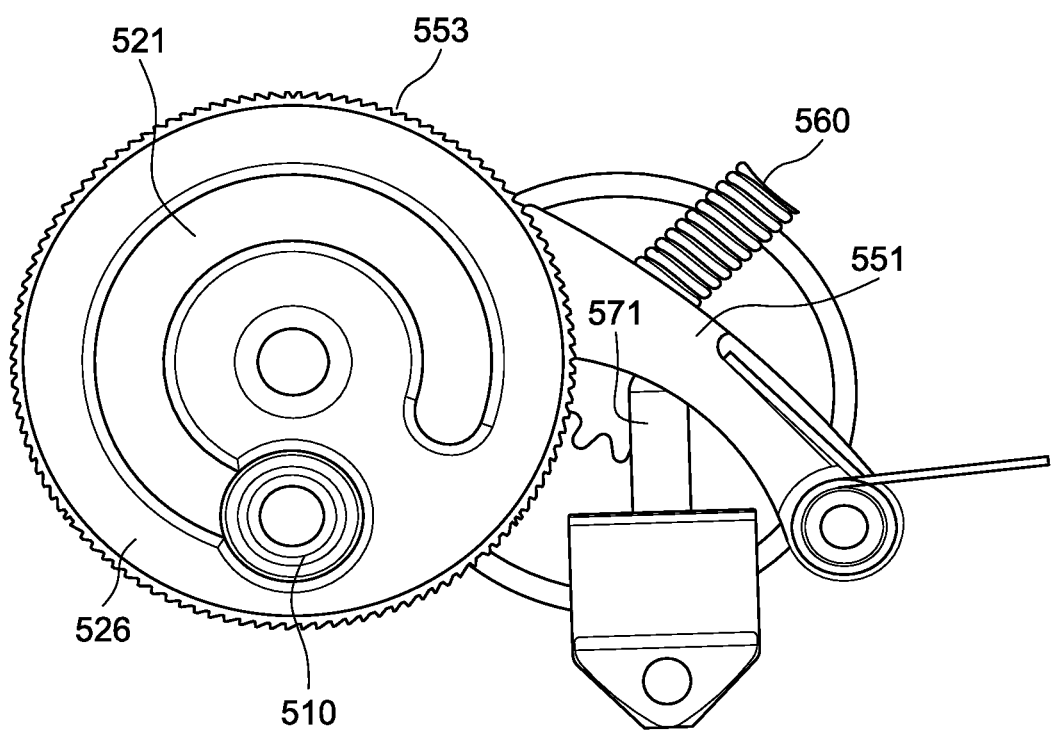
FIG. 21 is an illustration of a clamp unit for locking a tip section of a wing in a flying configuration. A second view is shown of the clamp unit in a semi-engaged state.

Referring to FIGS. 18 and 20 an entrance hole 522 may be provided at one end of the slot 521 in order to allow the head 511 of the catch 510 to enter and exit the slot 521. The diameter of the entrance hole 522 is greater than the diameter of the head 511 of the catch 510, such that the catch 510 may freely enter and exit the slot 521 through the entrance hole 522. This is shown in FIGS. 18 to 21. The diameter of the entrance hole 522 may be large enough to allow the head 511 of the catch 510 to enter the hole 522 even when the head 511 and the hole 522 are not in perfect axial alignment. This may allow the head 511 of the catch 510 to enter/exit the entrance hole 522 as the tip section 300 of the wing 100 rotates towards/away from the inboard section 200, into and out of the flying configuration.

Figure 22:
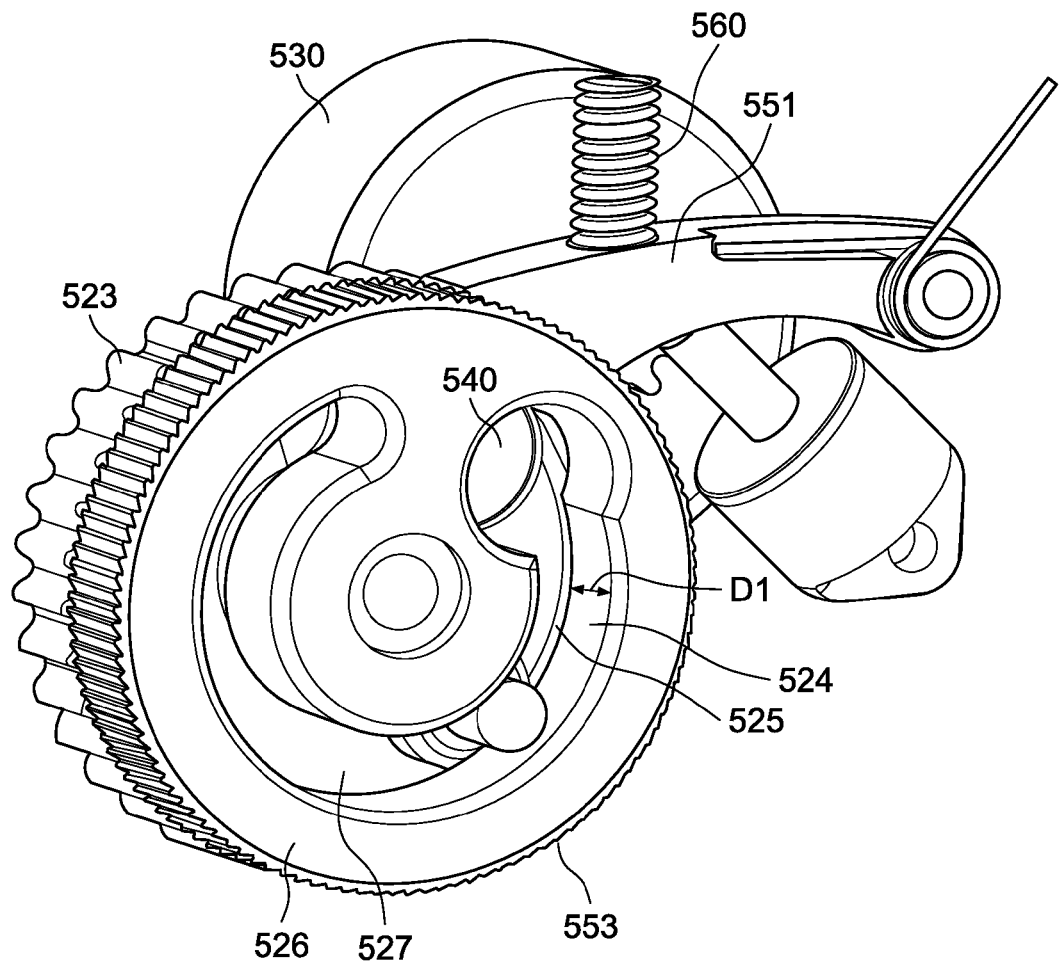
FIG. 22 is an illustration of a clamp unit for locking a tip section of a wing in a flying configuration. A first view is shown of the clamp unit in a locked state.
Figure 23:
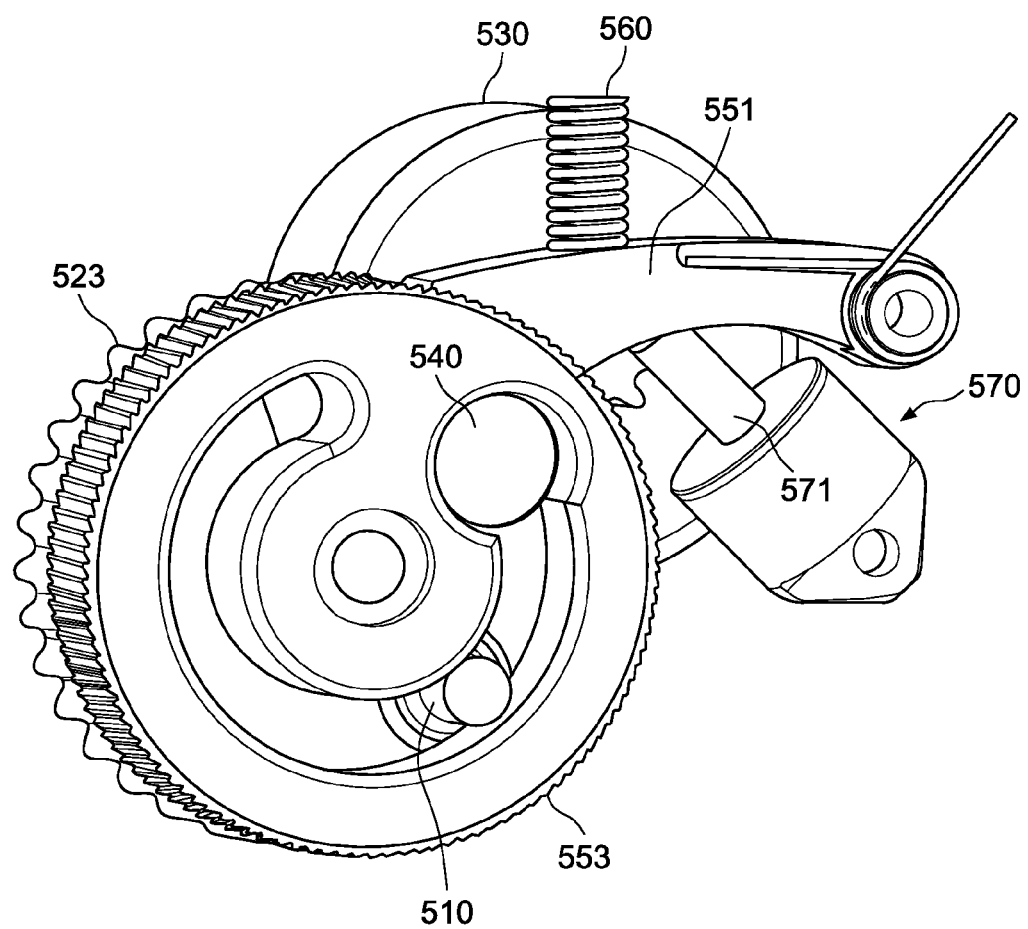
FIG. 23 is an illustration of a clamp unit for locking a tip section of a wing in a flying configuration. A second view is shown of the clamp unit in a locked state, in which a shot bolt is extended to a fail-safe position.
Figure 24:
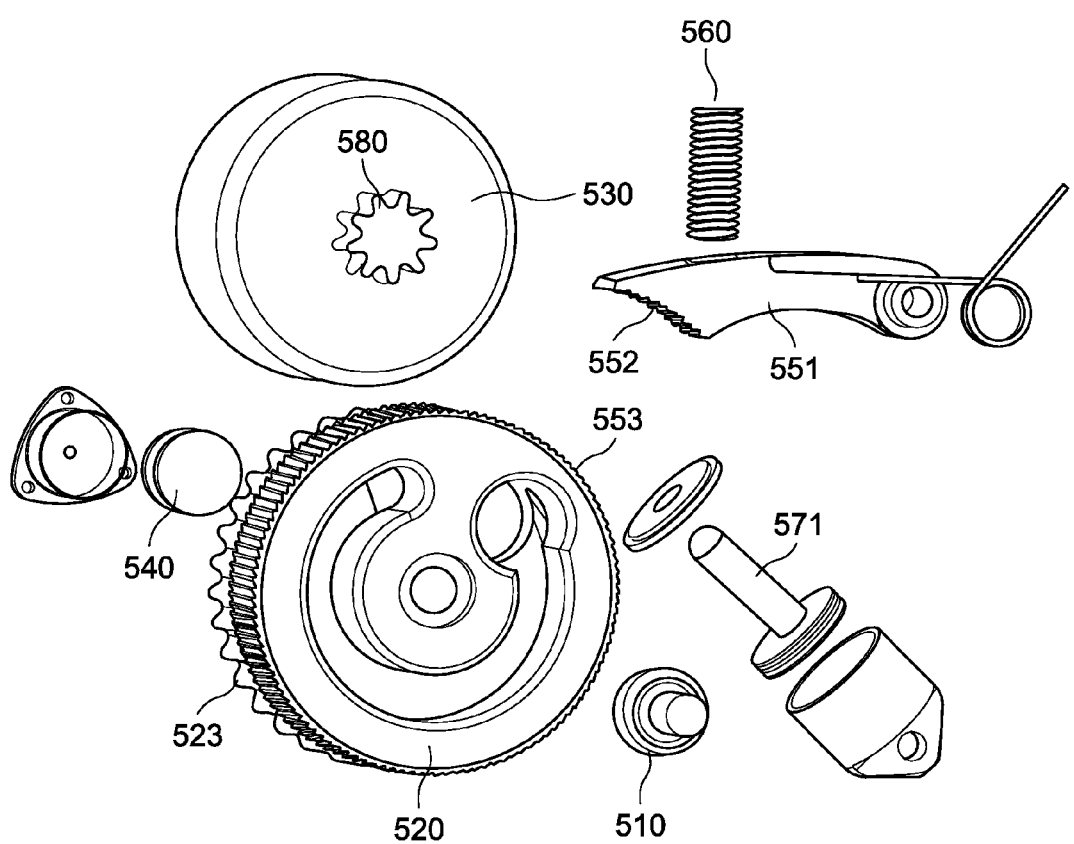
FIG. 24 is an exploded view of the clamp unit shown in FIGS. 18 to 23. The individual components of the clamp unit are shown from a first side of the clamp unit.
Figure 25:
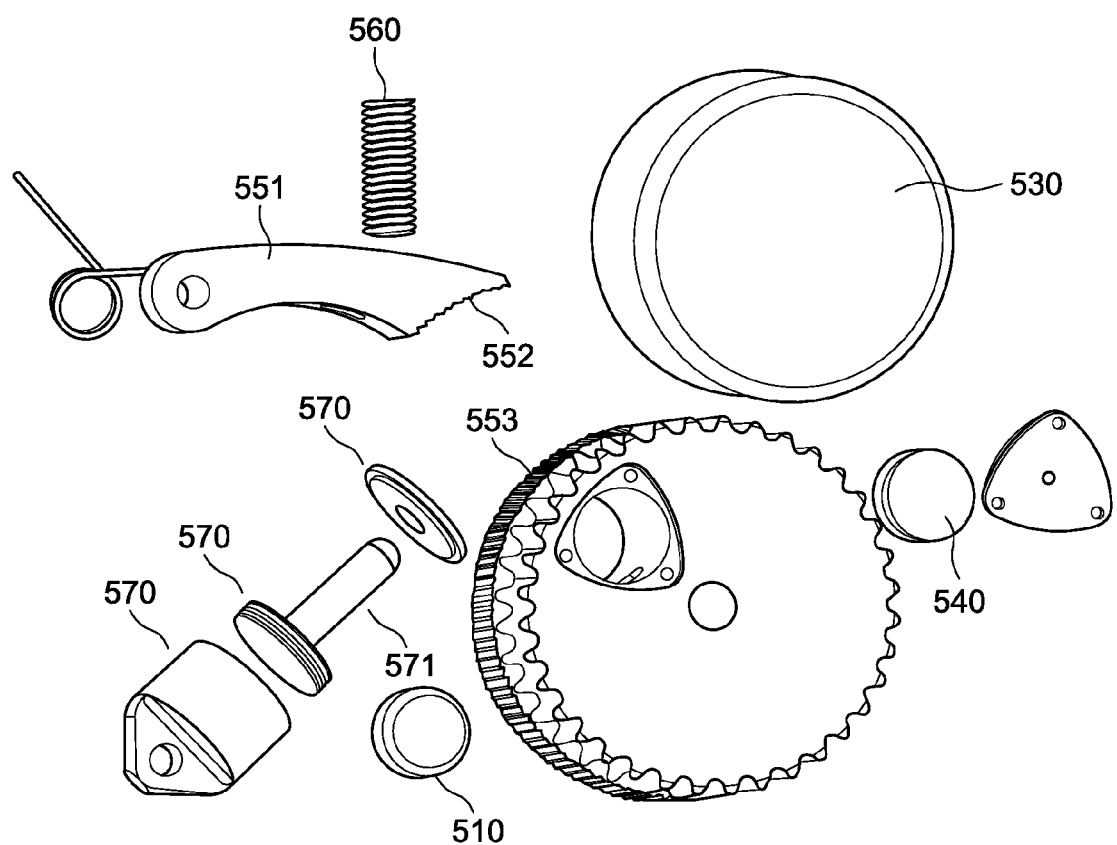
FIG. 25 is a second exploded view of the clamp unit shown in FIGS. 18 to 23. The individual components of the clamp unit are shown from an opposite side of the clamp unit to that shown in FIG. 24.

Referring to FIG. 22, the slot 521 may comprise a narrower section 524 configured to accommodate the stem 512 of the catch 510, and a wider section 525 configured to accommodate the head 511 of the catch 510. The wider section 525 may be directly beneath the narrower section 524. More specifically, the narrower section 524 may extend into the plate 520 directly away from an engagement face 526 of the plate 520. The narrower section 524 may have a substantially constant width over the length of the slot 521, which substantially matches the diameter of the stem 512 of the catch 510. However, a sufficient amount of clearance may be provided to allow the stem 512 to slide along the path of the arcuate slot 521. The depth D1 of the narrower section 524 may vary over the length of the slot 521. More specifically, the shallowest part of the narrower section 524 may be directly adjacent the entrance hole 522 and the deepest part of the narrower section 524 may be at the opposite end of the slot 521. The depth D1 of the narrower section 524 may increase substantially linearly as the slot 521 extends away from the entrance hole 522. For example, the depth D1 of the narrower section may increase by between 3 mm and 5 mm over the length of the slot 521. This may cause the wider section 525 of the slot 521 to ramped, such that it spirals deeper into the plate 520 as the slot 521 extends away from the entrance hole 522. This is explained in more detail below.

The wider section 525 of the slot 521 may lie directly beneath the narrower section 524 such that the stem 512 of the catch 510 can extend through the narrower section 524 and the head 511 of the catch 510 can be secured in the wider section 525 of the slot 521. As with the narrower section 524, the width of the wider section 525 may be substantially constant over the length of the slot 521. However, unlike the narrower section, the specific depth D2 (not shown in Figures) of the wider section 525 of the slot 521 may also be substantially constant over the length of the slot 521. The depth D2 may, for example, be substantially equal to the depth of the head 511 of the catch 510, although a small amount of clearance should be provided to allow the catch 510 to move in the slot 521.

More specifically, a front face (not shown in Figures) of the wider section 525 of the slot 521 (closest to the engagement face 526 of the plate 520) may be substantially parallel to a rear face 527 of the wider section 525 of the slot 521 (furthest from the engagement face of the plate 520). Therefore, the distance between the front face of the wider section 525 and the engagement face 526 of the plate 520 varies directly with the depth D1 of the narrower section 524 of the slot 521. Similarly, the distance between the rear face 527 of the wider section 525 and the engagement face 526 of the plate 520 varies directly with the depth D1 of the narrower section 524 of the slot 521, remaining substantially parallel with the front face of the wider section 525. This causes the distances between both front and rear faces of the wider section 525 of the slot 521 and the engagement face 526 of the plate 520 to increase as the slot 521 extends away from the entrance hole 522. The wider section 525 thus ramps away from the engagement face 526, spiraling deeper into the plate 520 as the slot 521 extends away from the entrance hole 522 in a manner corresponding to the increasing depth D1 of the narrower section 524.

The width of the wider section 524 of the slot 521 adjacent the entrance hole 522 may be greater than the corresponding width of the head 511 of the catch 510 such that head 511 can slide along the arcuate slot 521 away from the entrance hole 522. However, only a small clearance need be provided.

In one example, the plate 520 is a rotary plate coupled to a concentric spur gear 523 at the rear of the plate 520. A driving means such as an actuator 530 may comprise a driving spur gear 580 configured to mesh with the spur gear 523 at the rear of the plate 520. The driving means 530 may be configured to drive a rotation of the plate 520 via the spur gear 523, such that the plate 520 rotates with respect to both the tip section 300 of the wing 100 and the catch 510 to lock the tip section 300 and inboard section 200 of the wing 100 together in the flying configuration. It should be noted that the spur gears discussed above could be replaced with spiral/helical tooth form gears or worm drive tooth form gears. More specifically, in an exemplary operation, the plate 520 may be mounted in the tip section 300 of the wing 100 such that the entrance hole 522 is aligned with the head 511 of the catch 510 in the inboard section 200 when the wing 100 is in the flying configuration. In this configuration, the head 511 of the catch 510 may enter the entrance hole 522 in the slot 521 automatically upon the wing 100 entering the flying configuration. The actuator 530 may then drive a rotation of the plate 520 with respect to the catch 510 such that the head 511 of the catch 510 slides into the wider section 525 of the slot 521 to provide a locked configuration between the tip section 300 and inboard section 200 of the wing 100. The plate 520 may be rotated by the actuator 530 until the frictional contact between the deepening front face of the wider section 525 of the slot 521 and the head 511 of the fixed-position catch 510 causes a torque limit of the actuator 530 to be reached.

More specifically, as the plate 520 rotates, the ramped front face of the wider section of the slot 521 moves away from the fixed position of the catch 510 due to the fact that the front face of the wider section of the slot 521 is not parallel to the engagement face of the plate 520. As the front face of the wider section 525 of the slot 521 ramps away from the fixed position catch 510, the plate 520 may effectively pull the head 511 of the catch 510 against the front face of the wider section 525 of the slot 521, thereby increasing the amount of torque that is required to continue to rotate the plate 520. Once the torque limit of the actuator 530 is reached, the plate 520 ceases to rotate and the clamp unit 500 is locked.

As shown in FIGS. 18 to 26, a ratchet 550 may be provided to prevent the plate 520 from rotating in the opposite direction thus ensuring that the catch 510 does not undesirably disengage from the slot 521. The ratchet 550 may comprise a ratchet arm 551 comprising a first set of ratchet teeth 552. The teeth 552 on the ratchet arm 551 may engage with a second set of ratchet teeth 553 on a circumferential surface of the plate 520. The ratchet 550 may allow the plate 520 to rotate in a locking direction, whilst preventing the plate 520 from rotating in an unlocking direction unless the first and second sets of teeth 552, 553 are disengaged. This is shown in FIGS. 18 to 23. The teeth 552 of the ratchet arm 551 may be held against the teeth 553 on the circumferential surface of the plate 520 by resilient means 560 such as a coil spring 560. Disengagement of the first and second set of teeth 552, 553 may be facilitated by a ratchet release actuator 570, comprising an actuator arm 571 configured to force the ratchet arm 551 against the spring 560. When sufficient force is supplied by the release actuator 570, the spring 560 compresses and the teeth 552 on the ratchet arm 551 are lifted away from the teeth 553 on the plate 520.

Once the ratchet 550 is disengaged, the actuator 530 may drive a rotation of the plate 520 in the unlocking direction, thereby allowing the catch 510 to disengage from the slot 521 and the tip section 300 of the wing 100 to rotate out of the flying configuration.

The torque limited actuator 530 ensures that wear on the head 511 of the catch 510 caused by frictional contact with the front surface of the wider section of the slot 521 does not affect the secure connection between the plate 520 and the clamp 510 when the clamp unit 500 is in the locked configuration. For example, should the depth of the head 511 be reduced by wear, the frictional engagement between the front face of the wider section of the slot 521 and the catch head 511 will be reduced thereby allowing the torque-limited rotary actuator 530 to further rotate the plate 520 until the torque limit of the actuator 530 is reached again. Rotation of the plate 520 effectively causes the head 511 of the catch 510 to moves further around the slot 521, as is shown in FIGS. 22 and 23 and 26. The actuator 530 will always continue to rotate the plate 520 until its torque limit is reached, thereby always providing a securely locked configuration of the clamp unit 500.

This aspect of the clamp unit 500 ensures that a fully locked configuration is maintained in the flying configuration of the wing 100 even when the head 511 of the catch 510 is subject to a significant amount of wear. A transparent window may be provided in the skin of the wing 100 to allow ground crew to inspect the position of the catch 510 with respect to the slot 521 when the clamp unit 500 is in the locked configuration. When the position of the catch 510 in the locked configuration approaches the end of the slot 521, the catch head 511 should be replaced.

In the locked configuration, a shot bolt 540 may enter the entrance hole 522 to ensure that there is no possibility of the head 511 of the clamp 510 becoming aligned with the entrance hole 522 to allow the plate 520 and the clamp 510 to disengage. The shot bolt 540 is clearly shown in FIGS. 18, 22, 23 and 25. FIGS. 18 and 22 illustrate an unextended state of the shot bolt 540, and FIG. 23 illustrates the shot bolt 540 as being extended into the entrance hole in a "fail-safe" configuration. Both of the shot bolt 540 and the ratchet 550 may be disengaged upon landing of the aircraft, thereby allowing the plate 520 to rotate with respect to the catch 510 to disengage the clamp unit 500 and thereby allow the wing 100 to move to the parked configuration.

For increased safety, disengagement of both of the bolt 540 and ratchet 550 may be dependent upon the aircraft being on the ground. For example, a sensor may be configured to detect when a force is provided against the landing gear of the aircraft by the ground. Disengagement of the bolt 540 and ratchet 550 may be dependent upon the force experienced by the landing gear being greater than a predetermined threshold, which may be substantially equal to the weight of the aircraft, to ensure that the wing 100 cannot move to the parked configuration when the aircraft is in flight.

Figure 13:
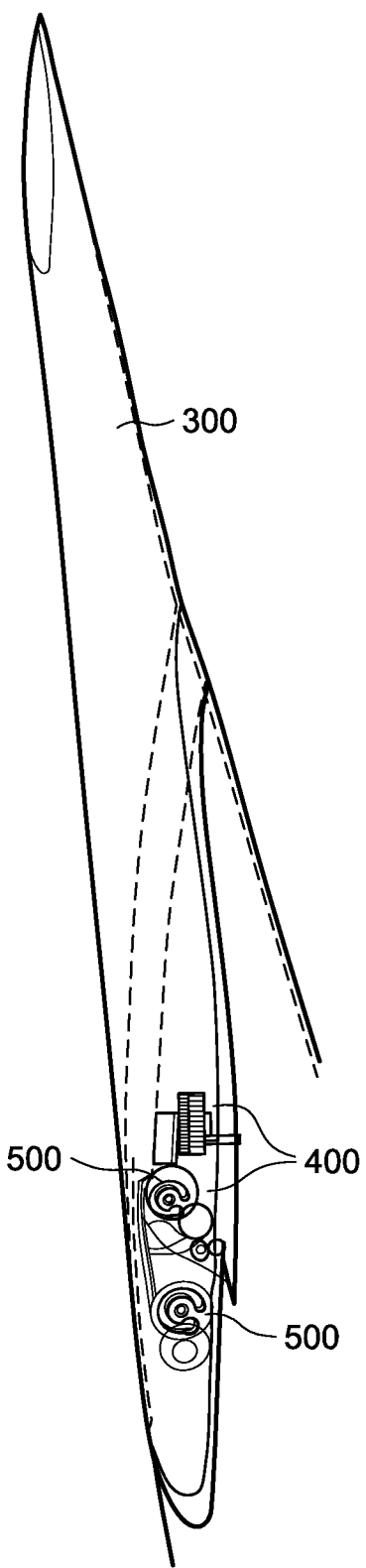
FIG. 13 is a view of the hinge unit at a join between the inboard and tip sections of the wing shown in FIG. 2.
Figure 14:
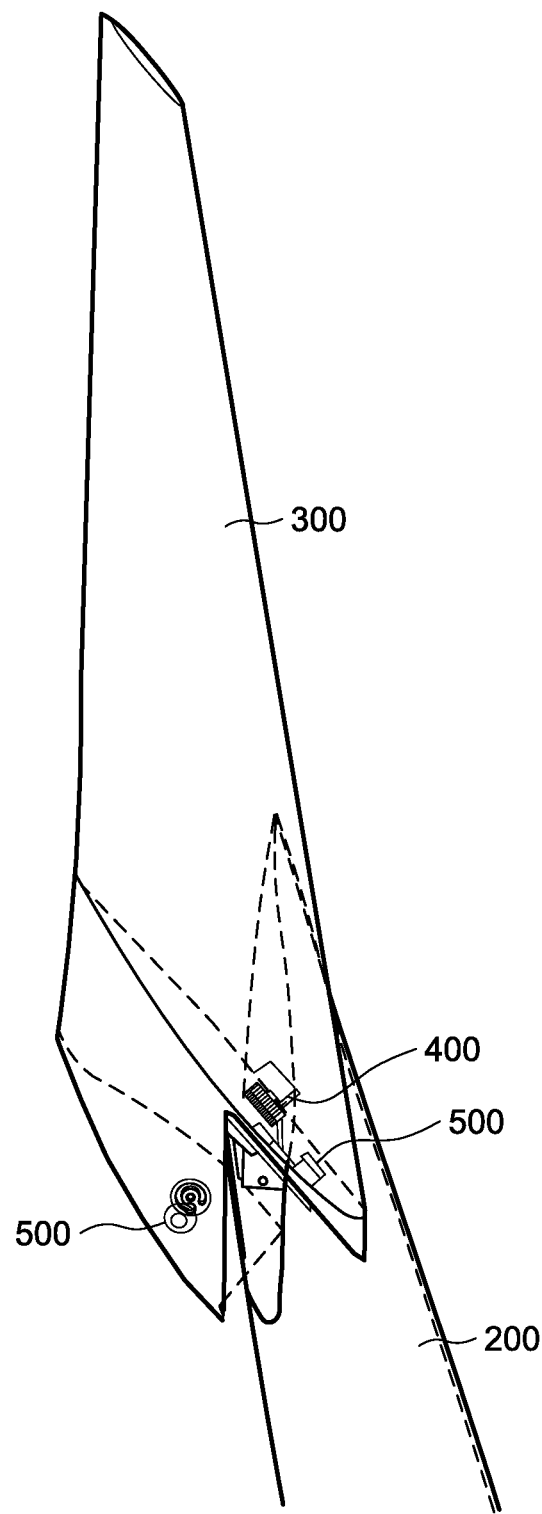
FIG. 14 is a view of the hinge unit at a join between the inboard and tip sections of the wing shown in FIG. 3.
Figure 15:
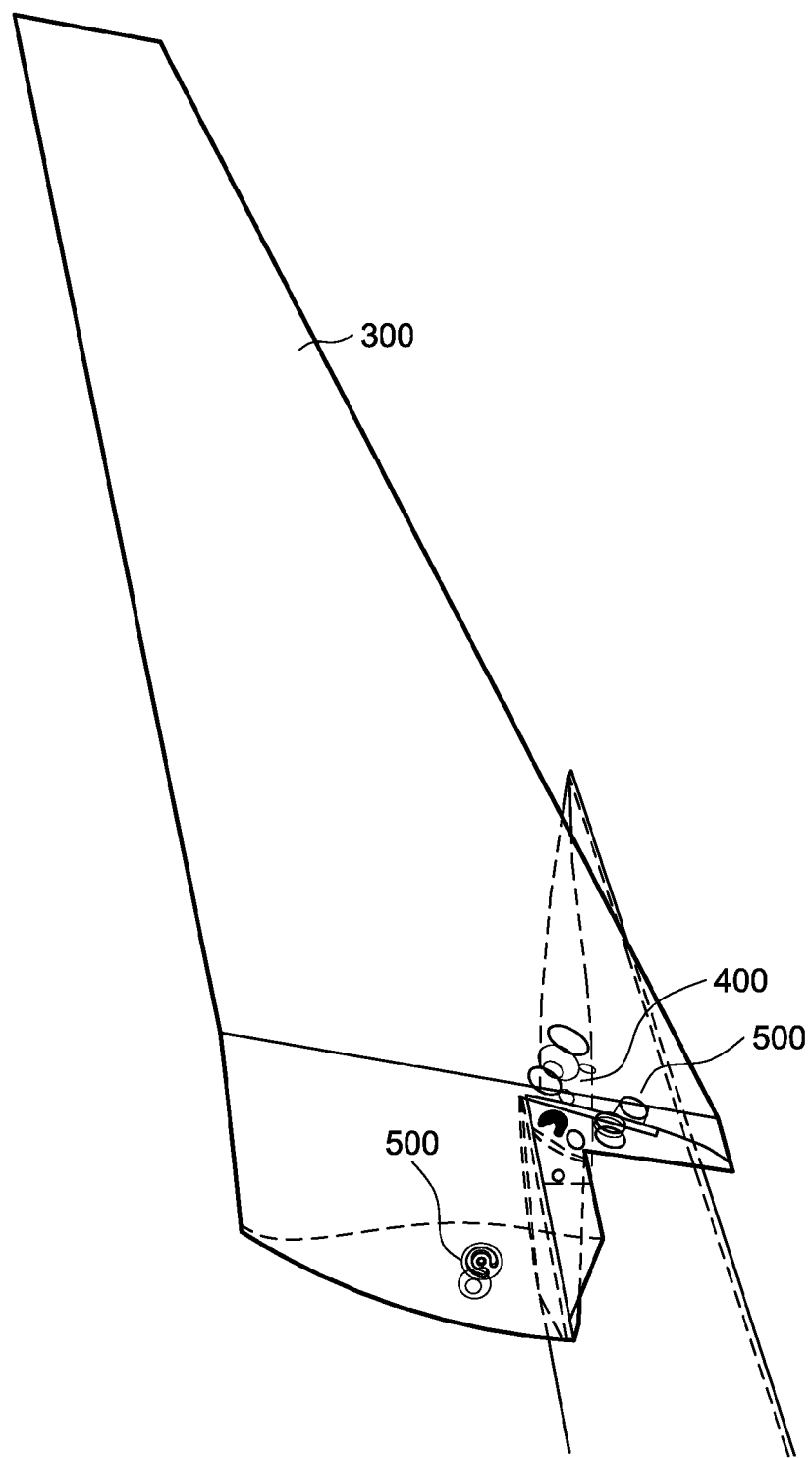
FIG. 15 is a view of the hinge unit at a join between the inboard and tip sections of the wing shown in FIG. 4.

The wing 100 may comprise a plurality of the clamp units 500 described above. For example, a clamp unit 500 of the type described above may be provided at the abutting faces of the inboard and tip sections 200, 300 of the wing 100, proximate each of the leading and trailing edges of the wing 100. The hinge unit 400 may be provided between them. This is shown in FIGS. 13, 14 and 15.

In the example described above, the plate 520 is described as being rotated by an actuator 530 with respect to a fixed-position catch/clamp head 511. It will be appreciated, however, than in an alternative configuration s suitable actuator could be used to drive the catch/clamp head 511 around the path of the slot 521 in the plate 520. In this alternative configuration, the plate 520 may be secured in a fixed-position such that it is not able to rotate.

It will be appreciated that the aerofoil 100 described above could be used on any type of aircraft, including military aircraft, helicopters and gliders. Furthermore, although the examples discussed above describe a fixed gear on the hinge shaft and a drive gear in the tip section, it will be understood that the invention could alternatively employ a drive gear on the hinge shaft and fixed gear in the tip section.

The invention claimed is:

1. An aerofoil comprising a trailing and including:
an inboard section;
a tip section moveable between a flying configuration and a parked configuration;
a hinge shaft mounted in the inboard section, said shaft having an upper end and a lower end, said shaft angled with said upper end closer than said lower end to both said trailing edge and said tip section;
a fixed gear mounted concentrically on the hinge shaft; and
a drive gear coupled to the tip section and configured to mesh with the fixed gear;
wherein a rotation of the drive gear against the fixed gear causes the tip section to rotate about the hinge shaft between the flying configuration and the parked configuration.

2. An aerofoil according to claim 1, further comprising a free gear mounted concentrically on the hinge shaft and configured to mesh with the drive gear.

3. An aerofoil according to claim 2, wherein the fixed gear, drive gear and free gear respectively comprise first, second and third bevel gears.

4. An aerofoil according to claim 1, wherein the hinge shaft is mounted on an inner frame in the inboard section.

5. An aerofoil according to claim 1, wherein the drive gear is mounted on a drive shaft extending from the tip section to the hinge shaft.

6. An aerofoil according to claim 1, wherein the drive gear is coupled to a driving means mounted in the tip section, the driving means being configured to rotate the drive gear against the fixed gear.

7. An aerofoil according to claim 1, wherein a rotation of the tip section between the flying configuration and the parked configuration comprises a rotation of substantially ninety degrees about both a chordal axis of the aerofoil and a longitudinal axis of the aerofoil.

8. An aerofoil according to claim 1, further comprising a clamp unit configured to lock the tip section in the flying configuration, the clamp unit comprising a narrowing slot and a clamp head configured to move along the slot until a frictional engagement corresponding to a locked configuration of the clamp unit is reached.

9. An aerofoil comprising a trailing edge and including:
an inboard section;
a tip section moveable between a flying configuration and a parked configuration;
a hinge shaft mounted at an angle in the inboard section and said shaft including an upper end and a lower end, said shaft angled with said upper end closer than said lower end to both said trailing edge and said tip section;
a drive gear mounted concentrically on the hinge shaft; and
a fixed gear coupled to the tip section and configured to mesh with the drive gear;
wherein rotation of the drive gear against the fixed gear causes the tip section to rotate about the hinge shaft between the flying configuration and the parked configuration.

10. An aerofoil comprising:
an inboard section;
a tip section moveable between a flying configuration and a parked configuration; and
a clamp unit configured to lock the tip section in the flying configuration, the clamp unit comprising an arcuately shaped ramped slot and a clamp head configured to follow an arcuate path along the slot until a frictional engagement corresponding to a locked configuration of the clamp unit is reached.

11. An aerofoil according to claim 10, wherein the clamp unit further comprises an actuator configured to move the slot with respect to the clamp head until the frictional engagement between the slot and clamp head causes a predetermined torque limit of the actuator to be reached.

12. An aerofoil according to claim 11, wherein the slot comprises an arcuate slot formed in a rotatably mounted plate, and the actuator is configured to rotate the plate with respect to the clamp head to enter the locked configuration of the clamp unit.

13. An aerofoil according to claim 10, wherein the clamp head has a T-shaped cross section and the slot has a T-shaped cross-section configured to accommodate the head.

14. An aerofoil according to claim 10, wherein the slot comprises an entrance hole having a diameter larger than a maximum diameter of the clamp head to allow the clamp head to enter the slot.

15. An aerofoil according to claim 14, wherein the clamp unit further comprises a bolt means, configured to block the entrance hole to prevent disengagement of the clamp head and the slot.

16. An aerofoil according to claim 10, comprising a transparent window in a skin of the aerofoil to allow ground crew to inspect the relative positions of the clamp head and the slot in the locked configuration of the clamp unit.

17. An aerofoil according to claim 10, wherein the clamp unit further comprises a ratchet configured to prevent disengagement of the clamp head and the slot.

18. An aerofoil according to claim 17, wherein the ratchet is configured to allow the slot to rotate with respect to the clamp head in a locking direction, whilst preventing the slot from rotating with respect to the clamp head in an unlocking direction.

19. An aerofoil according to claim 17, wherein the ratchet can be released to allow disengagement of the clamp head and the slot thereby allowing the aerofoil to enter the parked configuration.

* * * * *